(12) United States Patent
Wong et al.

(10) Patent No.: US 9,134,992 B2
(45) Date of Patent: Sep. 15, 2015

(54) INTERACTIVE AND VISUAL PLANNING TOOL FOR MANAGING INSTALLS AND UPGRADES

(75) Inventors: Karen Natalie Wong, San Carlos, CA (US); Manaswi Shukla, San Bruno, CA (US)

(73) Assignee: VMware, Inc., Palo Alto, CA (US)

( * ) Notice: Subject to any disclaimer, the term of this patent is extended or adjusted under 35 U.S.C. 154(b) by 125 days.

(21) Appl. No.: 13/222,644

(22) Filed: Aug. 31, 2011

(65) Prior Publication Data

US 2013/0055155 A1    Feb. 28, 2013

(51) Int. Cl.
*G06F 3/048* (2013.01)
*G06F 9/445* (2006.01)
*G06F 9/44* (2006.01)
*G06F 9/455* (2006.01)

(52) U.S. Cl.
CPC ............... *G06F 8/65* (2013.01); *G06F 9/4446* (2013.01); *G06F 9/45558* (2013.01)

(58) Field of Classification Search
CPC .................................................. G06F 3/048
USPC ........................... 717/168, 171, 172; 715/810
See application file for complete search history.

(56) References Cited

U.S. PATENT DOCUMENTS

| | | | | |
|---|---|---|---|---|
| 5,926,180 A * | 7/1999 | Shimamura | ................... | 715/739 |
| 2006/0224998 A1* | 10/2006 | Riss et al. | ...................... | 715/848 |
| 2006/0265709 A1* | 11/2006 | Meaney | ........................ | 717/178 |
| 2007/0233838 A1* | 10/2007 | Takamoto et al. | ............ | 709/223 |
| 2007/0240151 A1* | 10/2007 | Marl et al. | ...................... | 717/174 |
| 2010/0175060 A1* | 7/2010 | Boykin et al. | ................ | 717/173 |
| 2011/0061046 A1* | 3/2011 | Phillips | ......................... | 717/176 |
| 2011/0126187 A1* | 5/2011 | Alberti et al. | .................. | 717/172 |
| 2011/0161949 A1* | 6/2011 | Kodaka | ........................ | 717/168 |
| 2012/0151474 A1* | 6/2012 | Biran et al. | ....................... | 718/1 |
| 2012/0311106 A1* | 12/2012 | Morgan | ........................ | 709/220 |

OTHER PUBLICATIONS

Belmonte, Nicolas, "Visualizing Linux package dependencies", <http://philogb.github.com/blog/2008/11/02/visualizing-linux-module-dependencies/> on Nov. 2, 2008, 9 pages.*
Belmonte, Nicolas, "Data visualization", <http://philogb.github.com/>, 6 pages.*

* cited by examiner

*Primary Examiner* — William Bashore
*Assistant Examiner* — Jeanette J Parker

(57) ABSTRACT

A method for generating an upgrade plan for assets included in a virtualized computing environment includes receiving a selection of one or more target assets to receive updates. The method further includes receiving a selection of one or more upgrade packages, determining a first set of target assets that is capable of being upgraded with at least one selected upgrade package, determining a second set of target assets that depend on the first set of target assets, and generating an upgrade plan for the first set of target assets and the second set of target assets.

19 Claims, 27 Drawing Sheets

Add Targets/Tasks

✓ Select Targets and Tasks
Check Dependencies
Ready to complete

⚠ 2 hosts have 10 dependencies that also require upgrades or patches.

ⓘ The plan needs to add the highlighted tasks and targets to resolve the dependencies.

| Targets | #Targets | Selected Software |
|---|---|---|
| ☑ 🖥 Host 123 | | 4.0 |
| ▲ ☑ ⊞ Virtual Machines | 3 | 4.0 |
| ☑ ⊞ VSM | | Selected Software |
| ☑ 🖥 Host 2345 | | 4.0 |
| ▲ ☑ ⊞ Virtual Machines | 5 | |
| ☑ ⊞ VSM | | 5.0  ⓘ Dependency Satisfied more |

604

[Back] [Next] [Cancel]

Total: 3 steps, 200 targets, 302 tasks  ▨ Prepare  ▨ Upgrade/Install  ▨ Maintenance Mode

FIG. 6B

Add Targets/Tasks

✓ Select Targets and Tasks
✓ Check Dependencies
Ready to complete

Total Targets: 12 Hosts  10 Virtual Machines   Viewed by: Targets

| Targets | #Targets | Has Software Bundle | Selected Software |
|---|---|---|---|
| Clusters | 3 | | |
| Cluster 1 | | 2.0 | 4.0 |
| Cluster 2 | | 2.0 | 4.0 |
| Cluster 3 | | 2.0 | 4.0 |
| Hosts | 12 | | |
| Host 01 | | 3.0 | 4.0 |
| Host 02 | | 3.0 | 4.0 |
| Host 03 | | 3.0 | 4.0 |
| Host 04 | | 3.0 | 4.0 |
| Host 05 | | 3.0 | 4.0 |
| Host 06 | | 3.0 | 4.0 |
| Host 07 | | 3.0 | 4.0 |
| Host 08 | | 3.0 | 4.0 |

Back  OK  Cancel

Total: 3 steps, 200 targets, 302 tasks    Prepare  Upgrade/Install  Maintenance Mode

FIG. 7

Add Targets/Tasks

Probes last updated 2 days ago  Probe Again

Select Targets and Tasks
Check Dependencies
Ready to complete

Select Targets and Tasks
Select the targets to be added to the plan.

Targets: All Hosts in Virtual Center Y

| Targets: 1 criteria  Browse... | Features: No criteria  Browse... | Results: 475 Targets  Save Search |
|---|---|---| saved ▾ ☒ Search

☒ Search 806　　808　　810

☑ Show Nested Targets

| Targets | # Targets | Current Software | |
|---|---|---|---|
| ▲ ☑ 🗎 Hosts | 43 | Software Name - Version | Select Software |
| ▲ ☐ 🖴 Virtual Machines | 432 | Software Name - Version | Select Software |

Back　Next　Cancel

INTERACTIVE AND VISUAL PLANNING TOOL FOR MANAGING INSTALLS AND UPGRADES

BACKGROUND

Computer virtualization is a technique that involves encapsulating a physical computing machine platform into a virtual machine that is executed under the control of virtualization software running on a hardware computing platform (also referred to herein as "host system" or "host computer"). A group of hardware computing platforms may be organized as a cluster to provide the hardware resources for virtual machines. In a data center that employs virtual machines, it is common to see hundreds, even thousands, of virtual machines running on multiple clusters of host systems.

Cloud computing refers to distributed allocation of computing resources via a computer network rather than from a single local computer. A "cloud" can include one or more host computers that can be arranged as clusters of host computers. In addition, host computers and clusters of host computer can be arranged in a data center, and multiple data centers can be arranged as "virtual centers."

Both the initial install and upgrade of the cloud computing environment are often complicated because the interrelationships between various components of the cloud computing environment can be hard to track. For example, differences between hardware, firmware, and software versions of the various components can cause problems in a first component as a result of an installation or upgrade in a second component. If any one component does not install or upgrade successfully, then an entire data center can be rendered inoperable. The administrator must often account for many dependencies between assets and their individual versions, further adding complexity to the install and upgrade process.

Using conventional techniques, a system administrator must plan installs and upgrades very carefully. These processes can be quite complex, since upgrading one asset may require upgrading a few others as well, and this may continue as a domino effect. Furthermore, there may be critical systems running on the virtualized computing environment (e.g., at the data center level), leaving no room for error or downtime.

Another problem with current approaches to installs and upgrades is that conventional approaches typically involve a significant amount of effort by the administrator. The administrator must first take the initiative to discover what new features are available. Later, when creating an install and upgrade plan, the administrator must carefully research (e.g., online) for any information about what precautions to take or dependent installs must be run.

Accordingly, there remains a need in the art for a technique for managing a cloud computing environment that addresses the drawbacks and limitations discussed above.

SUMMARY

One or more embodiments of the invention provide a visual dashboard that displays the status of the components of the virtualized computing environment as well as new features and/or upgrades that are available. Embodiments also provide a technique to create a guided plan where the administrator can specify, at a high level, what constraints should be enforced. Additionally, embodiments provide a visualization tool that allows the administrator to see a visual overview of the virtualized computing environment and/or related items, dependencies between components of the virtualized computing environment, and a visual preview that shows the effects of performing an upgrade or install.

One embodiment of the invention provides a method for generating an upgrade plan for assets included in a virtualized computing environment includes receiving a selection of one or more target assets to receive updates. The method further includes receiving a selection of one or more upgrade packages, determining a first set of target assets that is capable of being upgraded with at least one selected upgrade package, determining a second set of target assets that depend on the first set of target assets, and generating an upgrade plan for the first set of target assets and the second set of target assets.

BRIEF DESCRIPTION OF THE DRAWINGS

FIGS. 6A-6B depict screenshots of a user interface for checking dependencies in an upgrade plan, according to various embodiments of the invention.

FIG. 7 depicts a screenshot of a user interface for an overview of an upgrade plan that is ready to complete, according to one embodiment of the invention.

FIGS. 8A-8E depict screenshots of alternate embodiments of user interfaces for generating an upgrade plan, according to various embodiments of the invention.

FIGS. 10A-10B depict screenshots of alternate embodiments of user interfaces for displayed dependencies between assets, according to various embodiments of the invention.

DETAILED DESCRIPTION

Figure 1A:
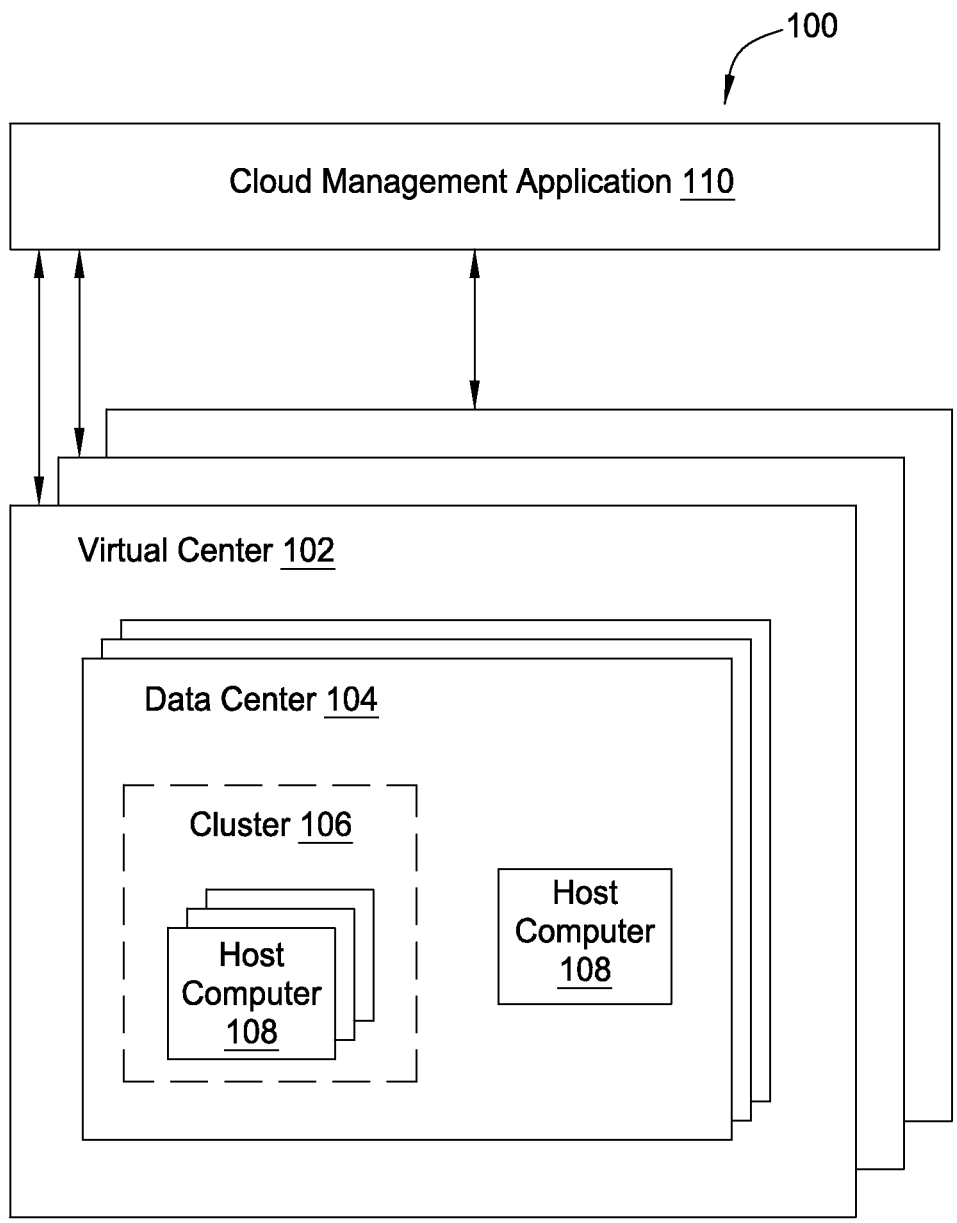
FIG. 1A depicts a block diagram of a virtualized computer system in which one or more embodiments of the present invention may be practiced.

FIG. 1A depicts a block diagram of a virtualized computer system 100 in which one or more embodiments of the present invention may be practiced. The computer system 100, which may include one or more virtual centers 102 and a cloud management application 110, in some cases, is referred to as "the cloud." Host computers 108 (also referred to herein as "servers") are configured to deliver virtualization-based distributed services to information technology environments. Each host computer 108 provides a virtualization layer that abstracts processor, memory, storage, and/or networking resources into multiple virtual machines that run on the same physical host computer 108. In one embodiment, virtualization software is installed directly on the server hardware and inserts a virtualization layer between the hardware and the operating system. The virtualization software partitions a physical host computer 108 into multiple secure and portable virtual machines that run on the same physical server. Each virtual machine represents a complete system—with processors, memory, networking, storage, and/or BIOS.

Host computers 108 are organized into a cluster 106. One or more clusters 106 and host computers 108 are organized into a data center 104. One or more data centers 104 are organized into a virtual center 102. One or more virtual centers are organized into the virtualized computer system 100, also referred to as "the cloud." The one or more virtual centers 102, and ultimately the host computers 108 included therein, are managed via a cloud management application 110. The cloud management application 110 manages the virtual infrastructure, including managing the host computers 108, the virtual machines running within each host computer 108, provisioning, migration, resource allocations, and so on.

The management operations of the cloud management application 110 can be performed via a client application (not shown). For example, each configuration task, such as configuring storage and network connections or managing the service console, can be accomplished centrally through the client application. In another example, an administrator can access the cloud management application 110 to install upgrades to one or more of the virtual centers 102, data centers 104, clusters 106, host computers 108, and/or virtual machines. One embodiment provides a stand-alone application version of the client application. In another embodiment, the client application is implemented as a web browser application that provides management access from any networked device.

According to some embodiments, administrators can access the cloud management application 110 to view and plan upgrades and installs. As described in greater detail herein, administrators use the cloud management application 110 to view "what-if" scenarios and dependencies involved in a potential upgrade, as well as to create a step-by-step plan of a phased upgrade process, ensuring either timing or availability of existing workload performance throughout the virtualized environment.

Figure 1B:
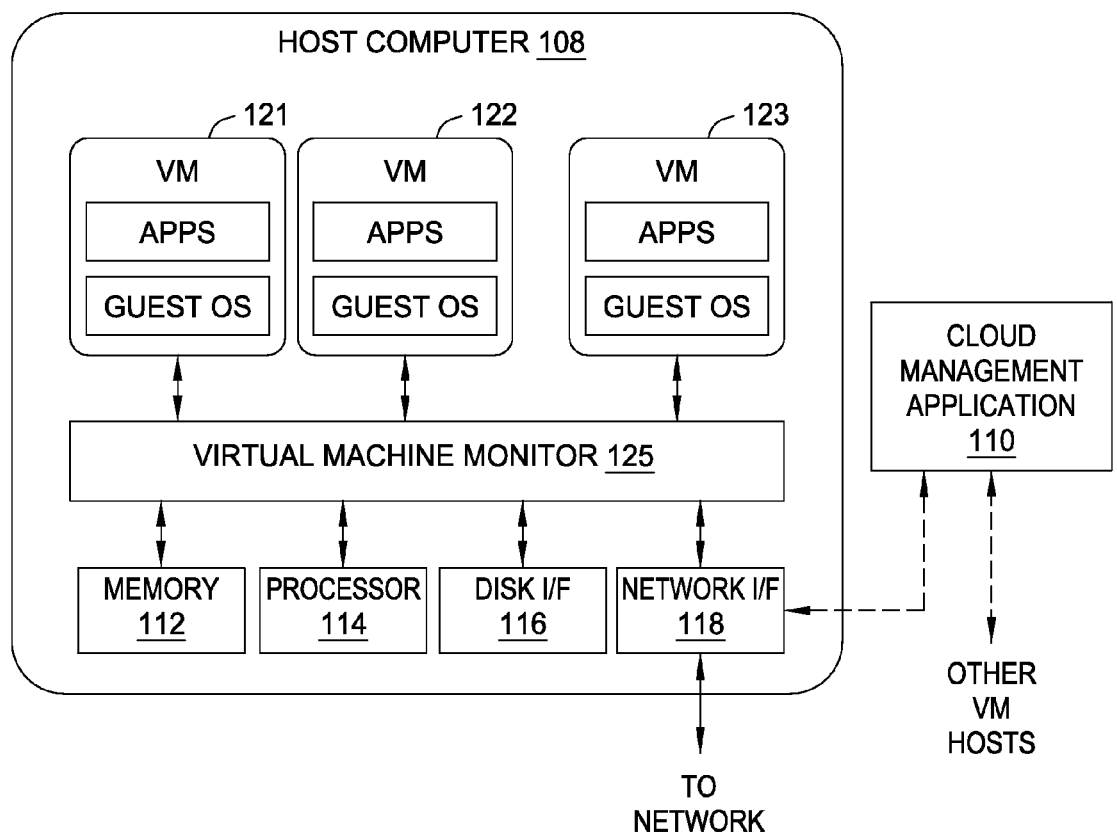
FIG. 1B depicts a block diagram of a host computer and cloud management center, according to one embodiment of the invention.

FIG. 1B depicts a block diagram of a host computer 108 and cloud management application 110, according to one embodiment of the invention. A virtualized environment includes a host computer 108 that has conventional components of a computing device, and may be implemented within a cluster 106 of computing devices, as shown in FIG. 1A. One or more virtual machines are configured within the host computer 108, represented in FIG. 1B as VM 121, VM 122, and VM 123, that share hardware resources of host computer 108, such as system memory 112, processor 114, disk interface 116, and network interface 118. Examples of disk interface 116 are a host bus adapter and a network file system interface. An example of network interface 118 is a network adapter, also referred to as a Network Interface Card (NIC). In some embodiments, a plurality of NICs is included in the network interface 118. The cloud management application may be coupled to the network interface 118 via a virtual center 102 server, which is coupled to a host computer 108, such an ESX host computer.

The virtual machines VM 121-123 run on top of a virtual machine monitor 125, which is a software interface layer that enables sharing of the hardware resources of host computer 108 by the virtual machines. Virtual machine monitor 125 may run on top of the operating system of the host computer 108 or directly on hardware components of the host computer 108. In some embodiments, virtual machine monitor 125 runs on top of a hypervisor that is installed on top of the hardware resources of host computer 108. Together, the virtual machines 121-123 and virtual machine monitor 125 create virtualized computer systems that give the appearance of being distinct from host computer 108 and from each other. Each virtual machine includes a guest operating system and one or more guest applications. The guest operating system is a master control program of the virtual machine and, among other things, the guest operating system forms a software platform on top of which the guest applications run.

In one embodiment, data storage for host computer 108 is served by a storage area network (SAN) (not shown), which includes a storage array (e.g., a disk array) and a switch (SAN fabric) that connects host computer 108 to storage array via the disk interface 116. In virtualized computer systems, in which disk images of virtual machines are stored in the storage arrays, disk images of virtual machines can be migrated between storage arrays as a way to balance the loads across the storage arrays. For example, the Storage VMotion™ product that is available from VMware Inc. of Palo Alto, Calif. allows disk images of virtual machines to be migrated between storage arrays without interrupting the virtual machine whose disk image is being migrated or any applications running inside it. In other embodiments, any technically feasible data storage implementation, other than a SAN, can be used to provide storage resources for host computer 104.

Figure 2:
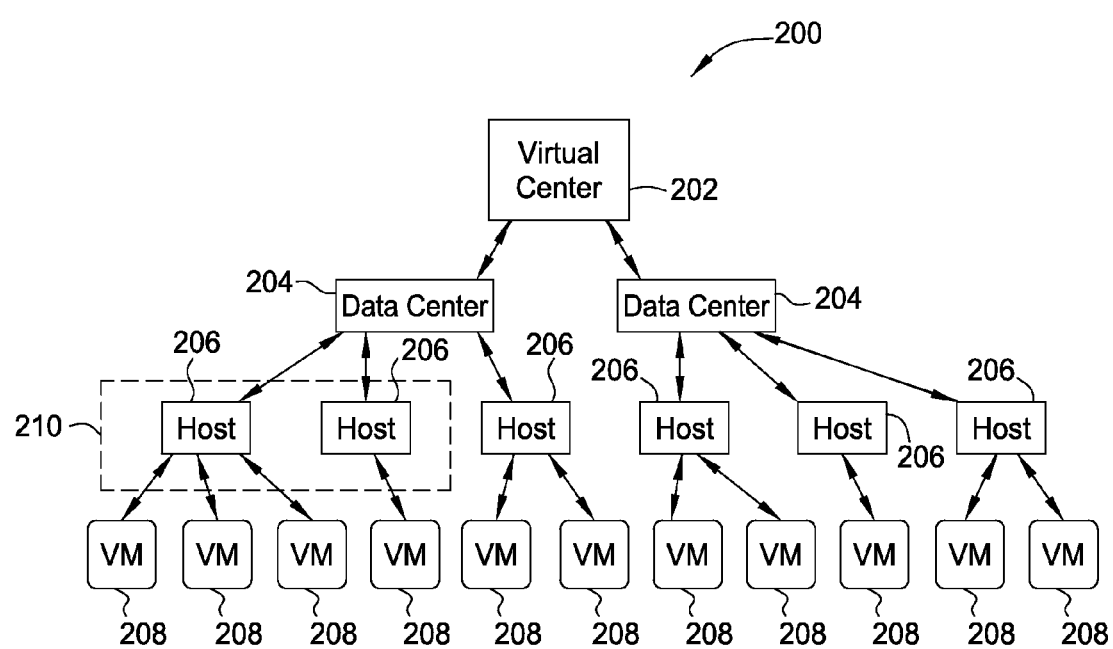
FIG. 2 depicts a hierarchical organization of a virtualized computing environment, according to one embodiment of the invention.

FIG. 2 depicts a hierarchical organization of a virtualized computing environment 200, according to one embodiment of the invention. As shown, a virtual center 202 is at the root of the hierarchy. The virtual center 202 includes one or more data centers 204. Each data center 204 includes one or more host computers 206. A set of host computers 206 are also organized as a cluster 210. Each host computer 206 runs one or more virtual machines (VMs). As described in greater detail herein, one or more updates are applied to objects in the virtual computing environment 200, which include the virtual center 202, data centers 204, host computers 206, and/or virtual machines 208.

As described in greater detail below, one or more embodiments of the invention provide a visual dashboard that displays the status of the components of the virtualized computing environment as well as new features and/or upgrades that are available. Embodiments also provide a technique to create a guided plan where the administrator can specify, at a high level, what constraints should be enforced. Additionally, embodiments provide a visualization tool that allows the administrator to see a visual overview of the virtualized computing environment and/or related items, dependencies between components of the virtualized computing environment, and a visual preview that shows the effects of performing an upgrade or install.

Figure 3:
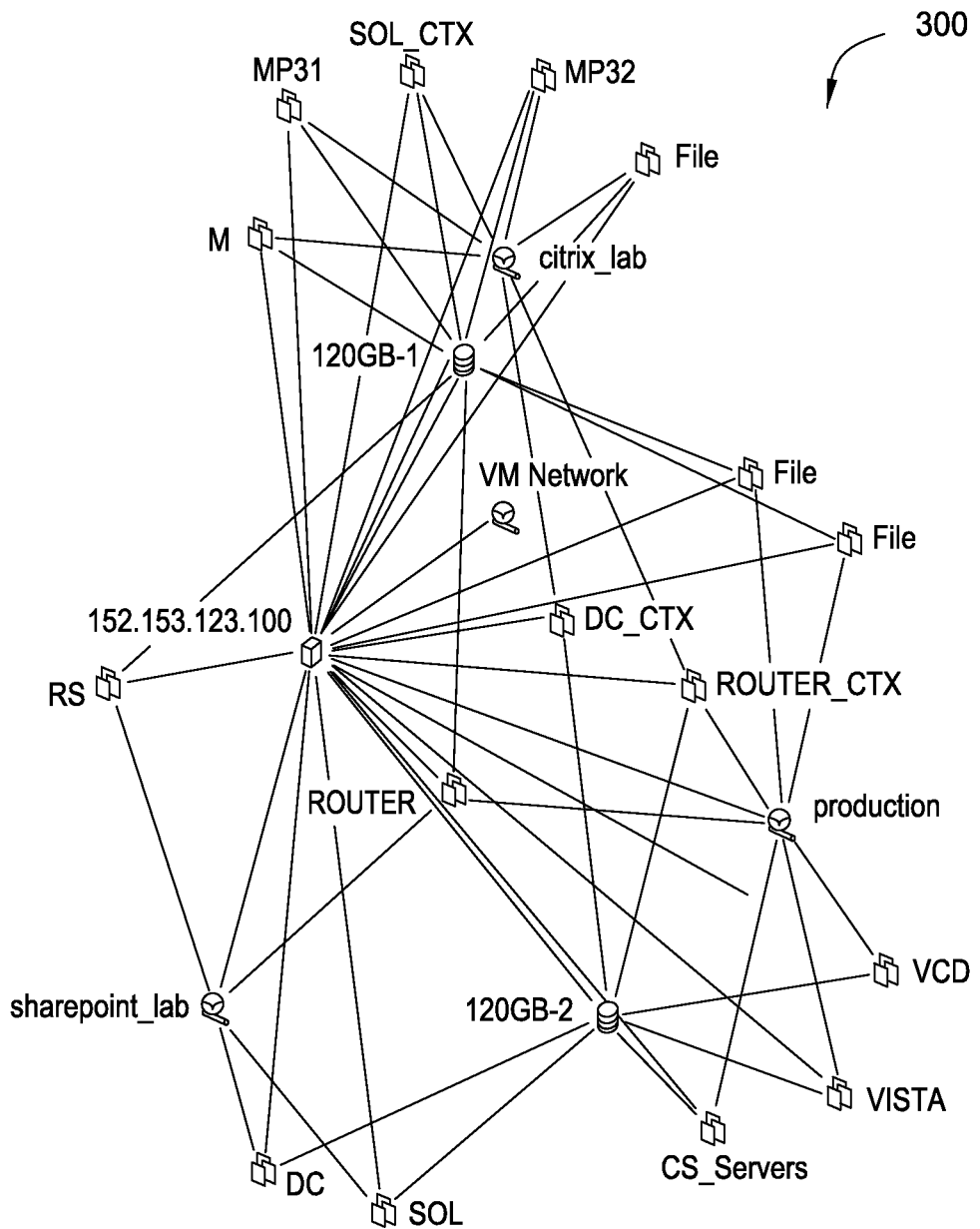
FIG. 3 is a conceptual diagram illustrating a topology map for a network, according to the prior art.

FIG. 3 is a conceptual diagram illustrating a topology map 300 for a network, according to the prior art. A topology map 300 is one conventional way to display interconnected network objects. As shown, objects are displayed as nodes and are connected with edges to show their relationships. Topology maps work well for a small set of network objects, but get increasingly complicated once a larger dataset is involved. At some point, it becomes difficult to visualize an understanding of the network because the topology map 300 becomes too cluttered. For example, a large number of edges may cross, making the topology map 300 hard to read. Alternate variations of the topology map use different layout algorithms to spread out the objects and edges in ways to try to maximize legibility. While this technique helps with a slightly larger number of nodes, it requires the entire diagram to take up a large amount of space. The user must then pan and zoom to an area of interest, thereby losing sight of the overall network.

Figure 4A:
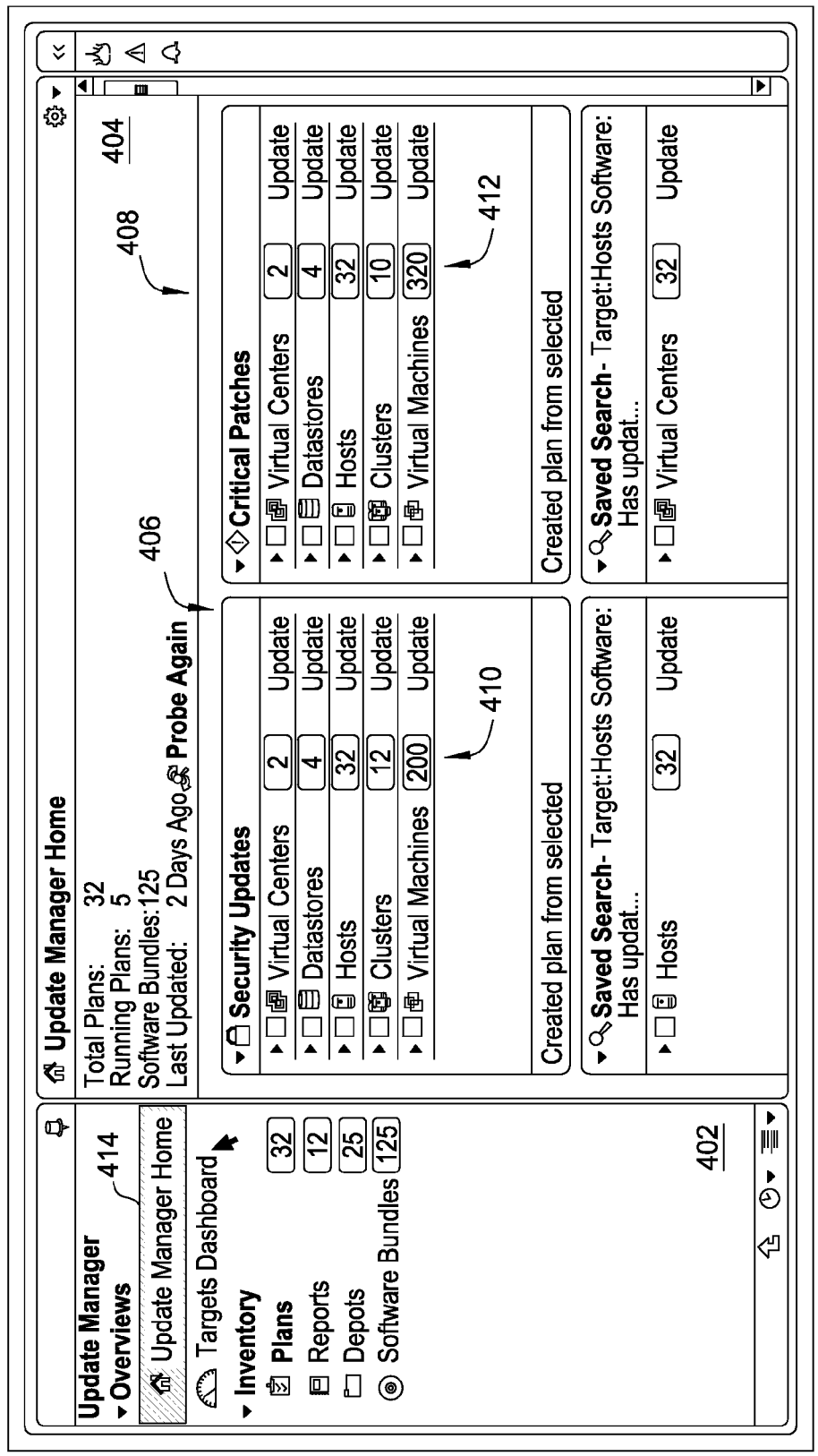
FIGS. 4A-4B depict screenshots of a user interface for managing updates in a virtualized computing environment, according to various embodiments of the invention.
Figure 4B:
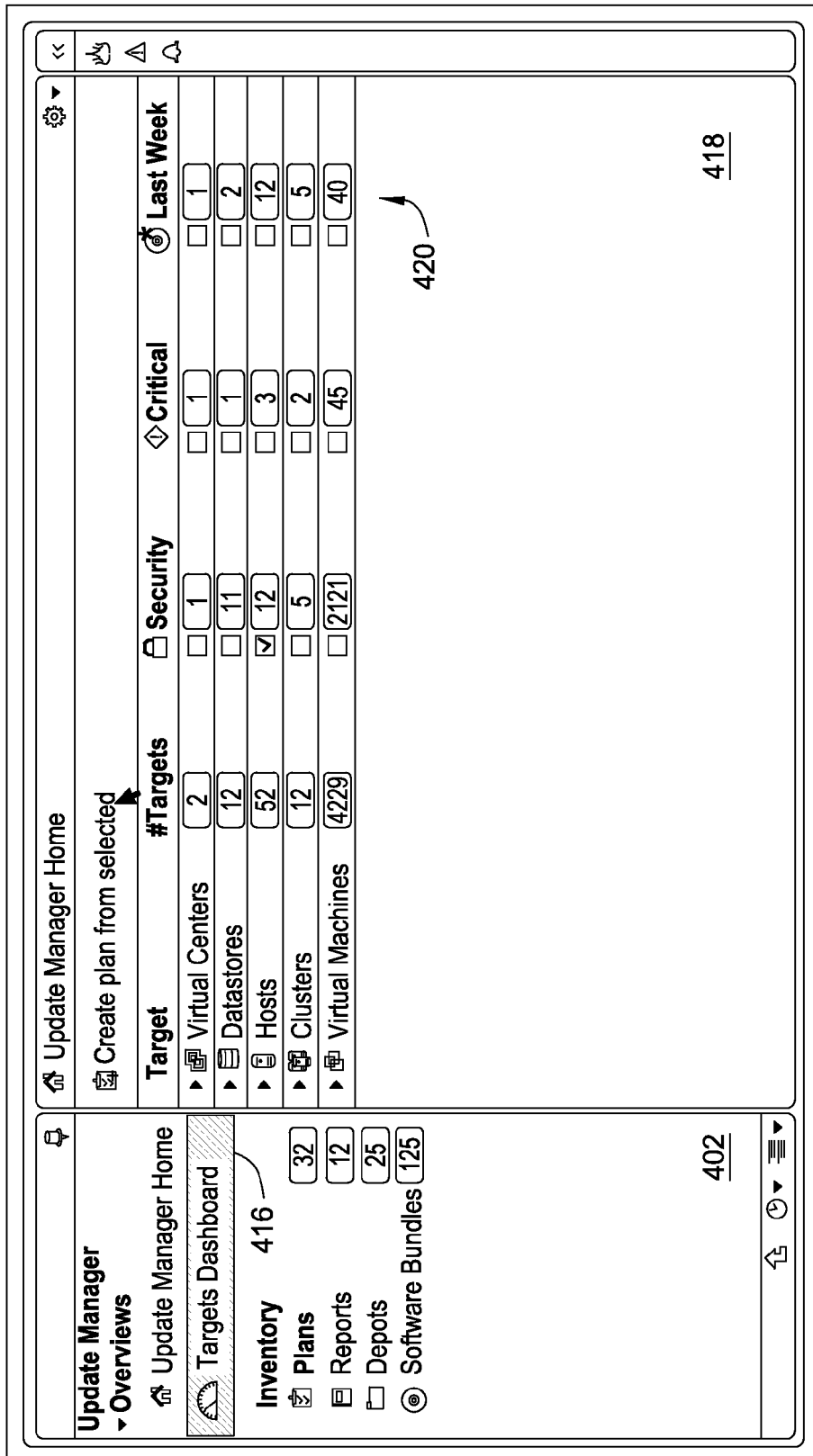

FIGS. 4A-4B depict screenshots of a user interface for managing updates in a virtualized computing environment, according to various embodiments of the invention. One goal of embodiments of the invention is to encourage administrators to upgrade their software as often as possible. One way to do this is to display, in the user interface of the cloud management application 110, what updates are available and also how much of the virtualized computing environment is at a particular upgrade "level" (i.e., version 3.0 or 4.0). As shown in FIG. 4A, the user interface includes a panel portion 402 and a main portion 404. The main portion 404 includes a security updates portion 406 and a critical patches portion 408. The administrator can select an "Update Manager Home" button 414 in the panel portion 402, which causes the security updates portion 406 and the critical patches portion 408 to be displayed. In another embodiment, display in the main portion 404 is customizable by the user, and the security updates portion 406 and/or the critical patches portion 408 may not be displayed.

For each of the security updates portion 406 and the critical patches portion 408, the user interface displays a listing of assets of the virtualized computing environment organized by type, wherein the assets may be virtual centers, datastores, hosts, clusters, virtual machines, etc. For each type of asset, the security updates portion 406 includes a count 410 of each asset type that is available to receive a security update. In some embodiments, when each asset type is expanded, separate counts may be displayed for the number of patches or updates that are available per object within that asset type. For each type of asset, the critical patches portion 408 includes a count 412 of each asset type that is available to receive a critical patch. From such a user interface as shown in FIG. 4A, the administrator can create and manage one or more upgrade "plans," as described below. For example, the administrator can select one or more target assets to be updated from the security updates portion 406. The administrator can then select the appropriate versions of the upgrades to be applied. The cloud management application 110 then determines whether any assets should also be updated based on dependencies from the selected target assets and generates an upgrade plan. In some embodiments, the upgrade plan can include additional parameters such as amount of time to complete the upgrade, percentage of down-time of assets while the upgrade is being completed, etc. The upgrade plan is created to respect the dependencies between objects and, in some embodiments, to minimize a number of phases or the time it takes to complete the upgrade plan. For example, the upgrade plan may attempt to perform as many operations in parallel as possible.

As shown in FIG. 4B, a selection is made (e.g., by an administrator) of a "Targets Dashboard" button 416 from the panel portion 402. Selecting the button 416 causes the dashboard portion 418 to be displayed. The dashboard portion 418 displays a listing of assets of the virtualized computing environment organized by type. For each type of asset, the dashboard portion 418 includes counts for the number of assets that are upgrade-able, the number of security updates available for those assets, and the number of critical updates available for those types of assets. Critical updates are more important than standard security updates. In some embodiments, column 420 displays a number of updates per asset type that have been released within the past week. The column 420 allows the administrator to quickly determine how many recent updates are available for each asset type.

Figure 5A:
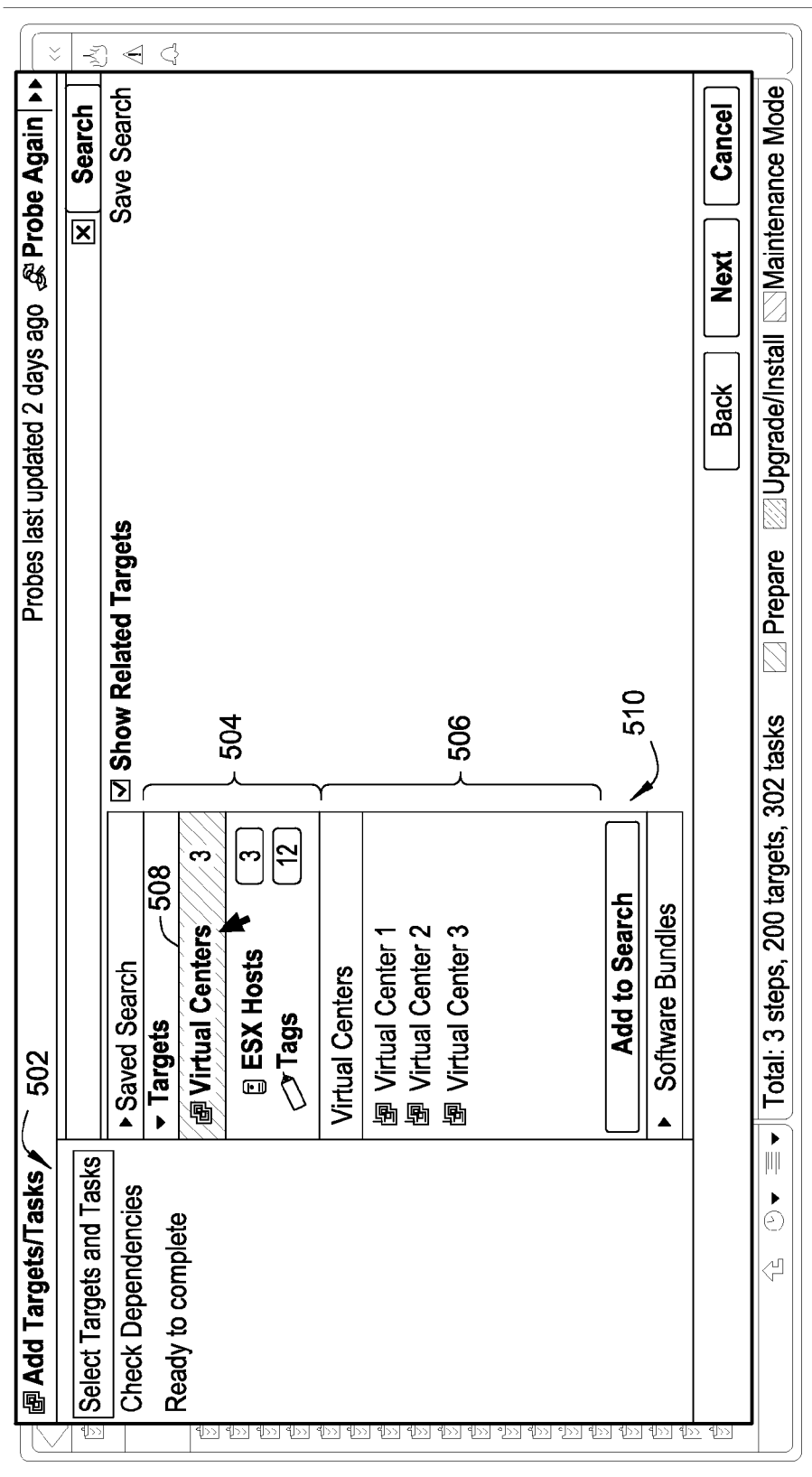
FIGS. 5A-5E depict screenshots of a user interface for selecting one or more targets for an upgrade plan, according to various embodiments of the invention.

FIGS. 5A-5E depict screenshots of a user interface for selecting one or more targets and tasks for an upgrade plan, according to various embodiments of the invention. As described in greater detail below, selecting one or more targets for an upgrade plan is the first component of an upgrade plan creation process 502 that includes three components: (1) selecting targets and tasks, (2) checking dependencies, and (3) being ready to add these items to the plan. During the "select targets" component, a user interface is displayed as shown in FIG. 5A. The targets for the upgrade are selected in a two-tier menu 510 that includes a top portion 504 and a bottom portion 506. When an item in the top portion 504 is selected, the administrator can drill-down into additional details of the selected item in the bottom portion 506. The user interface shown in the example in FIG. 5A includes a listing of three virtual centers displayed in the bottom portion 506 in response to an administrator selecting a virtual centers item 508 in the top portion 504. In another embodiment, the user interface may display the contents of the "bottom" portion 506 to the right of the objects in the "top" portion 504. In such a case, the labels "top" and "bottom" are not necessarily related to the spatial relationship of these portions of the display, but rather in terms of a hierarchy. Displaying the bottom portion 506 to the right of the top portion 504 enable displaying multiple columns per item, which may better identify the item.

Figure 5B:
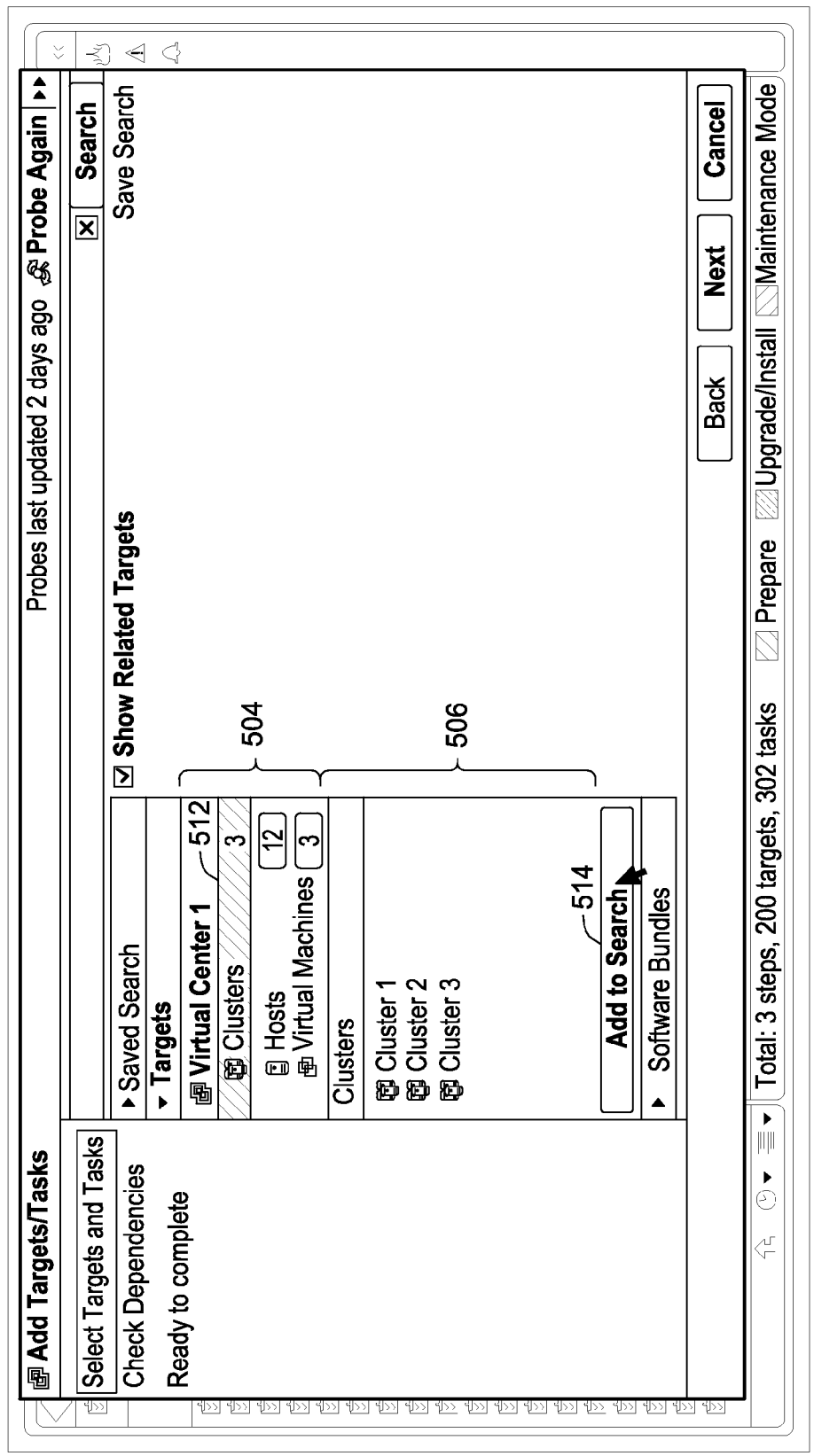
Figure 5C:
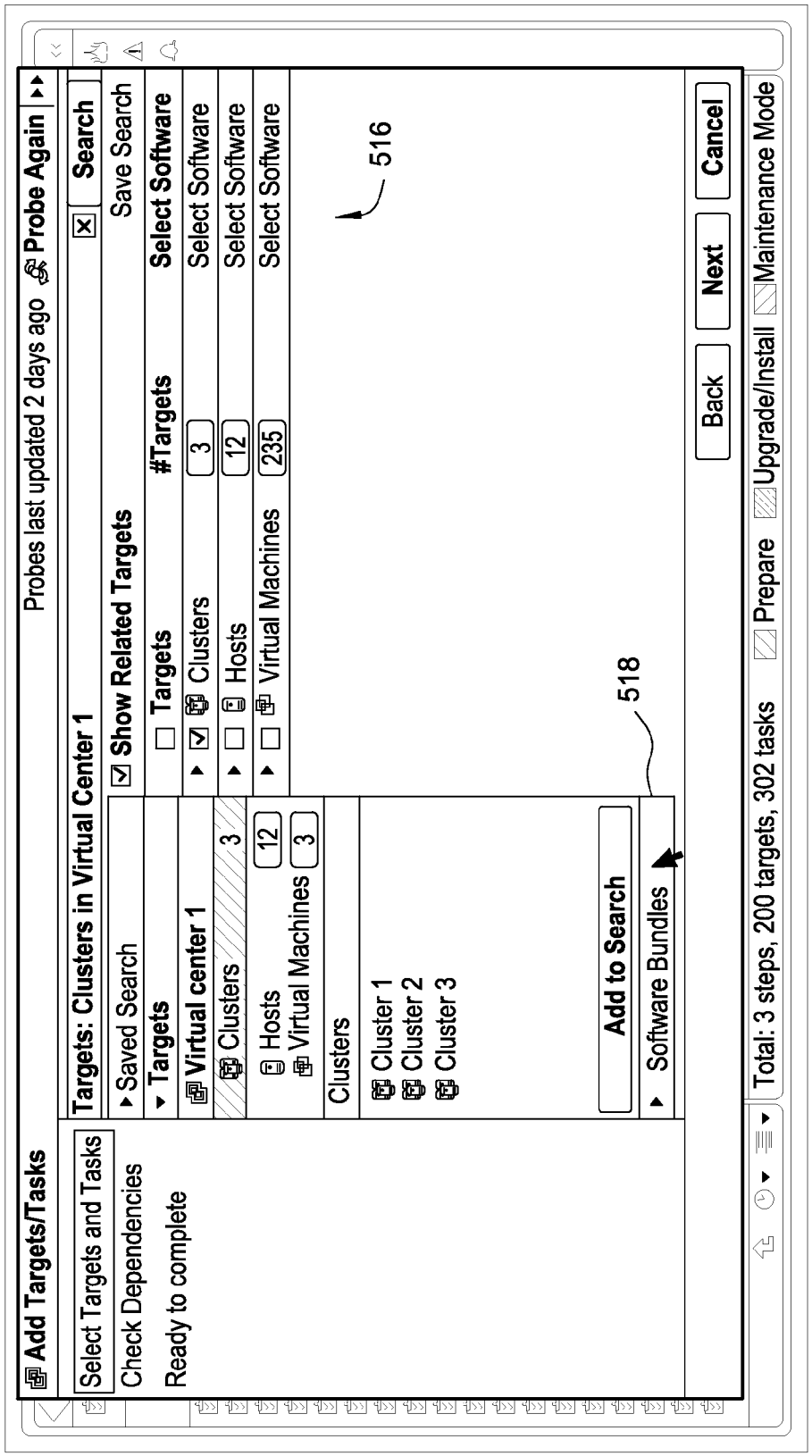

FIG. 5B shows the user interface after the administrator has selected "Virtual Center 1" from the bottom portion 506. In response, "Virtual Center 1" is moved to the top portion 504. As shown in the top portion 504 in FIG. 5B, "Virtual Center 1" includes clusters, hosts, and virtual machines. If the administrator then selects a "Clusters" button 512 in the top portion 504, a listing of the three clusters is displayed in the bottom portion 506. By implementing such a two-tiered navigation structure, embodiments of the invention allow the administrator to navigate an inventory with a large number of assets with an interface that uses only a small portion of the screen-space real estate of the overall user interface and still allows the user to easily "browse" the inventory.

Once the administrator has navigated to the asset category that he or she wishes to upgrade, the administrator can select the "Add to Search" button 514. Selecting the button 514 causes the user interface shown in FIG. 5C to be displayed, where the search query reflects the selected filters, and the search results shows the relevant targets. The administrator can then further filter the search results, using the same technique (i.e., by picking either additional target filters or feature/software bundle filters) and those remaining, resultant targets will be a part of the list of targets in the targets portion 516. In some embodiments, after the administrator adds filters via the browsing technique described above, the cloud management application 110 may construct a textual search query that is displayed to the user. Accordingly, the user is assisted in learning the scripting language to perform the search. Once the administrator is satisfied with the search query and the results, the administrator can copy the query and reuse it in a script or in the command line.

Figure 5D:
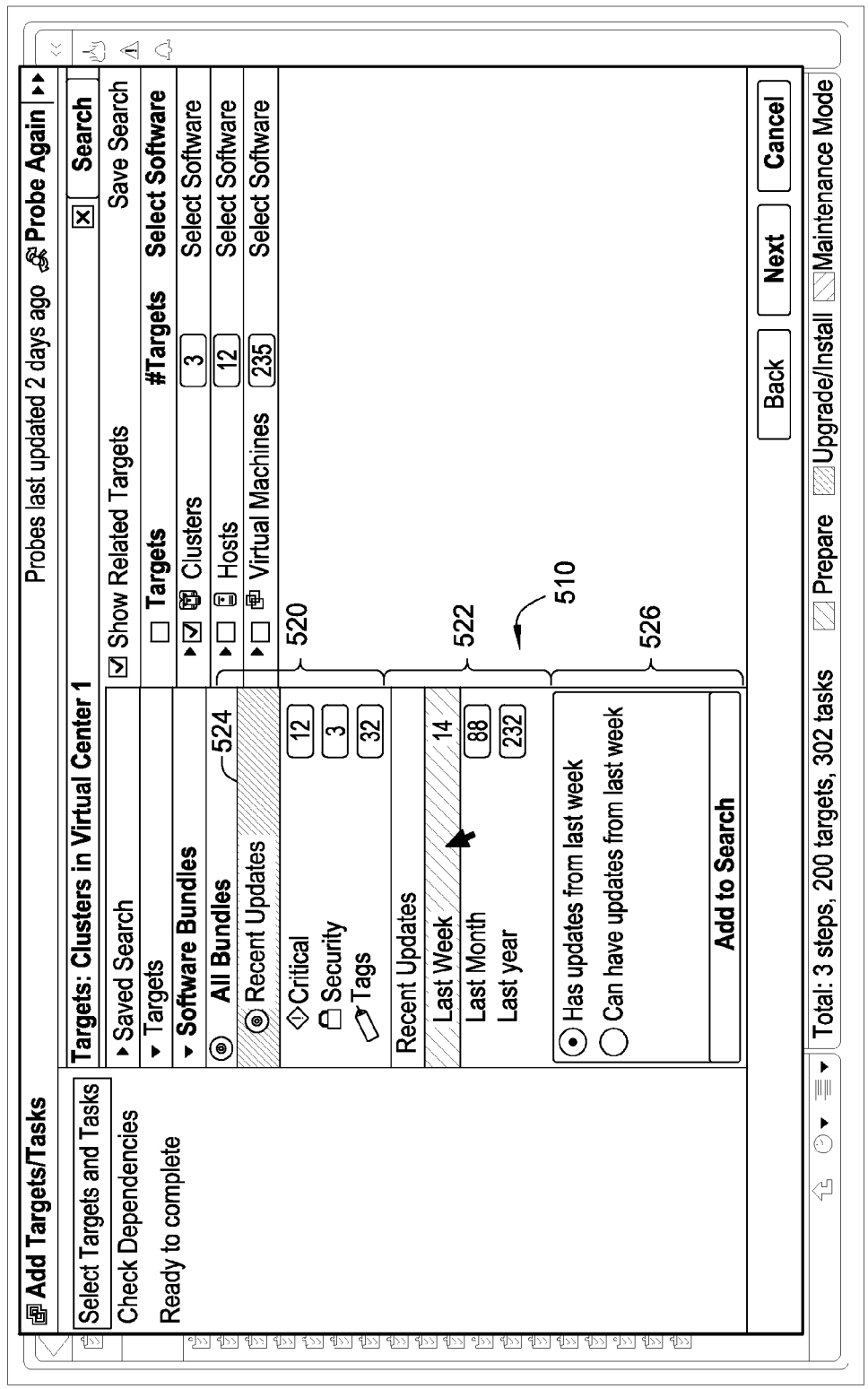

Once the administrator has finished selecting the relevant targets for the upgrade plan, the administrator can select the "Software Bundles" button 518. Selecting the software bundles button 518 causes the user interface shown in FIG. 5D to be displayed. FIG. 5D shows the software bundles portion of the two-tier menu 510. Similar to the two-tier structure for selecting targets, the two-tier menu 510 includes a two-tiered structure for selecting the upgrade bundles to be applied to the selected targets. As shown, the bundles section of the two-tier menu 510 includes a top portion 520 and a bottom portion 522. When an item in the top portion 520 is selected, the administrator can drill-down into additional details of the selected item in the bottom portion 522. The user interface shown in the example in FIG. 5D includes a listing of choices "last week," "last month," and "last year" displayed in the bottom portion 522 in response to an administrator selecting a "recent updates" item 524 in the top portion 520. In the example shown, "recent updates" item 524 is an example of an additional qualifier that can be added to the filters.

As also shown in FIG. 5D, the bottom portion 520 may include a context-sensitive portion 526. Depending on which item is selected in the top portion 520 and/or the bottom portion 522, different options are made available in the context-sensitive portion 526. For example, the context-sensitive portion 526 may include an option to select between targets that "already" have the selected updates installed or the targets that "can have" the selected updates installed. In another example, the context-sensitive portion 526 provides the ability to filter feature bundles by date (e.g., in the last N days), or targets by status. Selecting the option for targets that "already" have the selected updates installed provides a report of the assets that are already at the selected upgrade level. Selecting the option for targets that "can have" the selected updates installed provides a report of the assets that are ready to be upgraded to the selected upgrade level. In some embodiments, the "current upgrade level" of an asset (e.g., version 2.0) may be "too low" to be upgraded to the selected upgrade level (e.g., version 4.0). In such a case, another upgrade level would need to be applied first (e.g., version 3.0) before the asset can be upgraded to the selected upgrade level. Accordingly, assets whose current upgrade level is too low to be upgraded to the selected upgrade level are not included in the report of assets that "can have" the selected updates installed. In some embodiments, assets that can have the selected updates installed does include the assets that are "too low" to be upgraded to the selected upgrade level. In these embodiments, the system performs any intermediate upgrades stepwise until the asset is at an upgrade level that can be upgraded to the selected upgrade level.

Figure 5E:
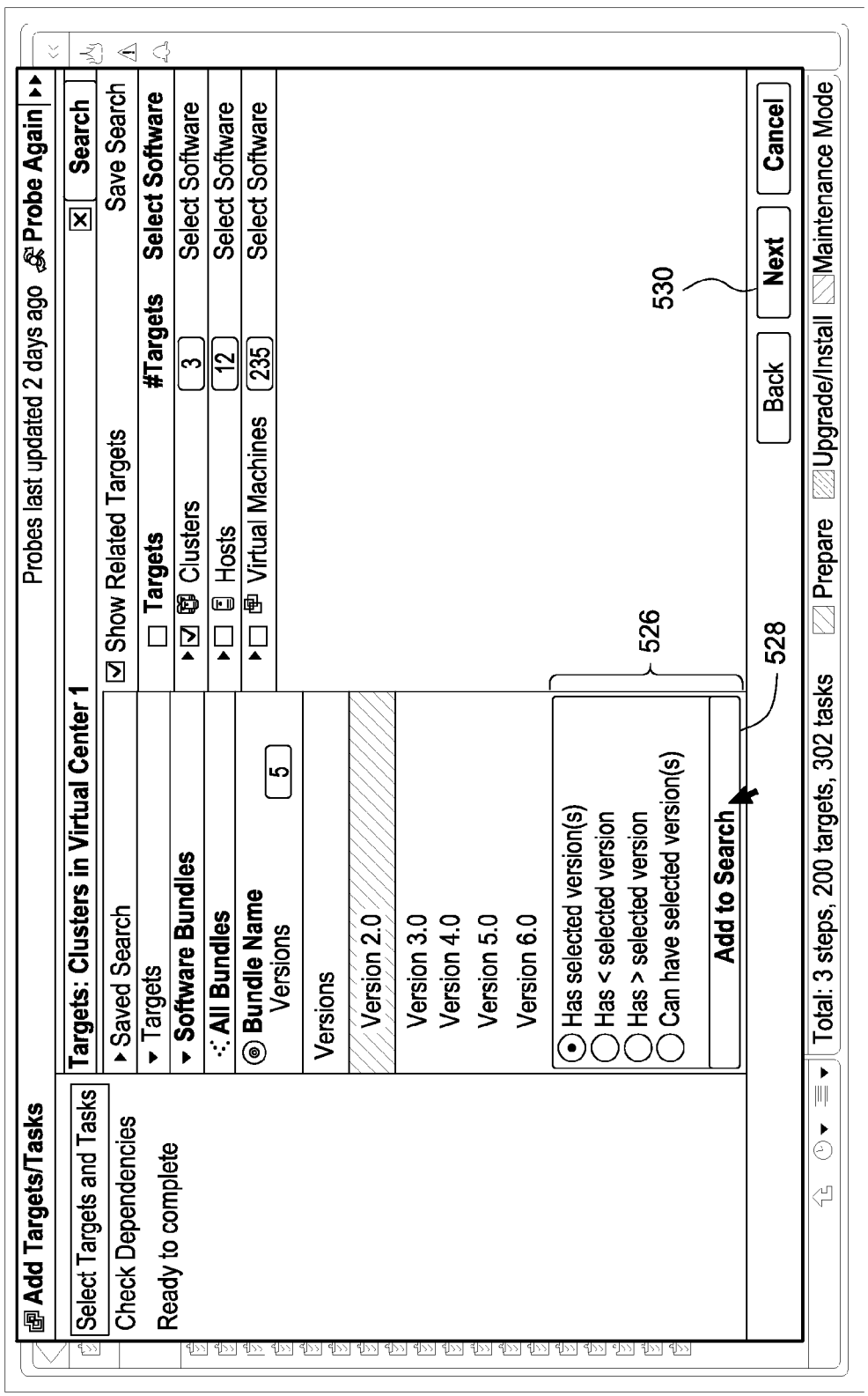

FIG. 5E depicts another example of the context-sensitive portion 526. In the example in FIG. 5E, the options in the context-sensitive portion 526 are related to version numbers of a selected upgrade bundle. For example, the options may include (a) assets that have the selected version already installed, (b) assets that currently have an installed version that is lower than the selected version, (c) assets that currently have an installed version that is higher than the selected version, or (d) assets that "can have" the selected version installed. Once the administrator has selected the appropriate setting in the context-sensitive portion 526, the administrator can select the "Add to Search Button" 528 to add the selected bundles and options to the search query, which then filters the results further. From there, once the targets and upgrades have been selected, the administrator selects the "Next" button 530 to move on to the next step of the upgrade plan creation process 502.

Figure 6A:
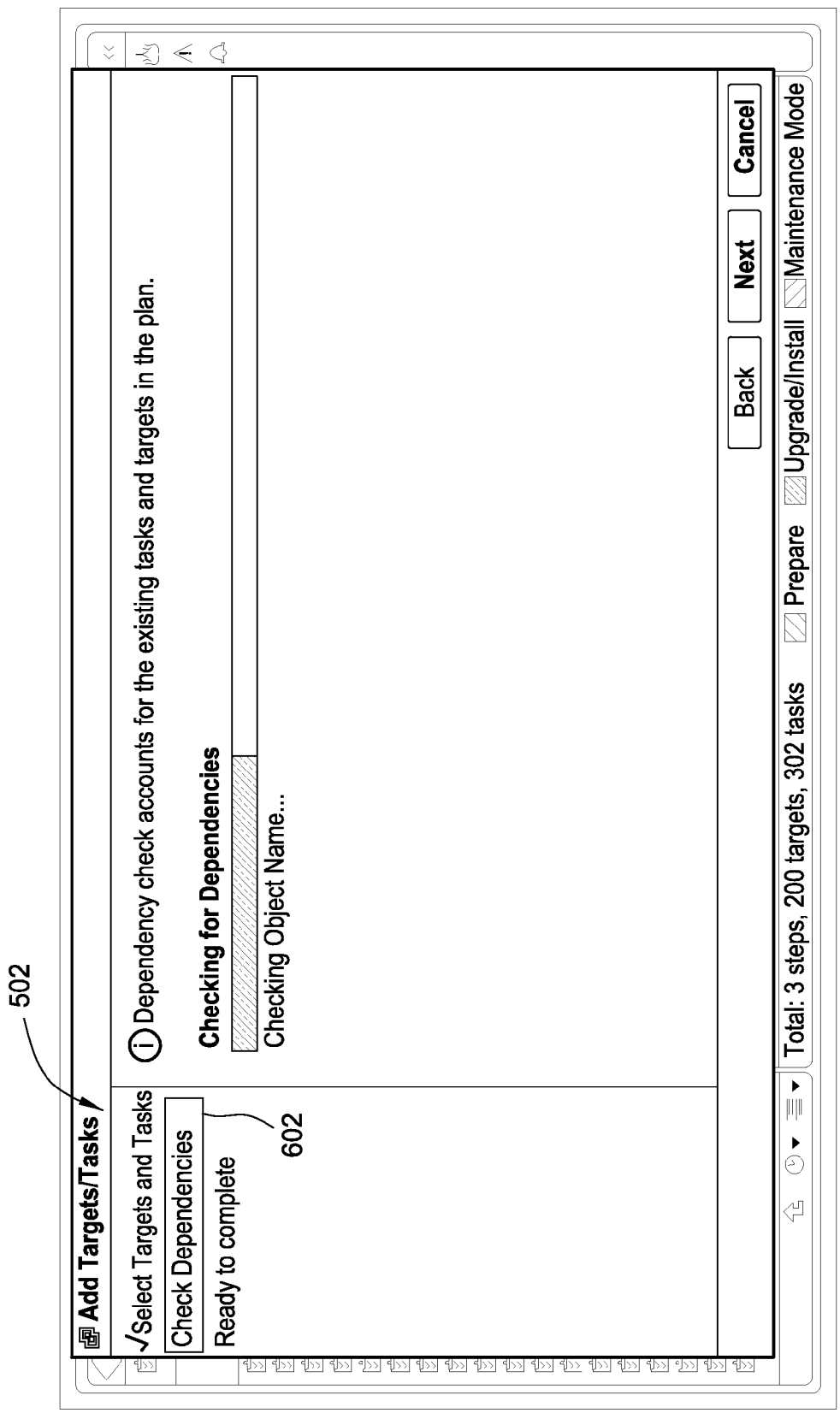

FIGS. 6A-6B depict screenshots of a user interface for checking dependencies in an upgrade plan, according to various embodiments of the invention. As described above, checking dependencies is the second step 602 in the upgrade plan creation process 502, which includes creating an upgrade plan from scratch or adding targets and/or dependencies to an already-existing upgrade plan. Based on the selected targets and upgrades, the cloud management application 110 determines which of the assets in the virtualized computing environment are to be updated as part of the upgrade plan. In some cases, when a particular asset is selected to be upgraded, other assets that depend on the particular asset may also need to be upgraded. In some cases, the assets that depend on the particular asset may be chained. For example, upgrade of asset A may require asset B to be upgraded. Asset B may require upgrade asset C to upgrade as well. In some embodiment, the dependency may require additional objects, such as a VSM (virtual service manager), to be created. The cloud management application 110 analyzes the virtualized computing environment based on the selected targets and upgrades and resolves the dependencies between assets so that dependent assets are also added to the upgrade plan.

FIG. 6B depicts the results of the cloud management application 110 checking for dependencies, according to one embodiment. In the example shown, the number of hosts selected as targets of the upgrade plan is two. After checking for dependencies, the cloud management application 110 determined that ten dependencies are present, including eight virtual machines and two VSMs (virtual service managers), where the VSMs are another type of asset that depend from host computers. The administrator can select which of the dependent assets should also be added to the upgrade plan. In one embodiment, all of the dependent assets are automatically added to the upgrade plan.

FIG. 6B shows a user interface where a task to upgrade the VSM is already included in the existing plan as indicated by icon 604. Thus, a separate task for this will not be duplicated.

Once the administrator confirms the selected dependencies, the upgrade plan creation process 502 moves on to step 702, as shown in FIG. 7, where a summary of the assets and upgrades is displayed in the user interface. The user can click on an "OK" button 704 when the assets are ready to be added to the plan. As described in greater detail below, based on the selected assets and upgrades, the cloud management application 110 can automatically generate an upgrade plan that defines when each of the assets is to be updated.

Figure 8A:
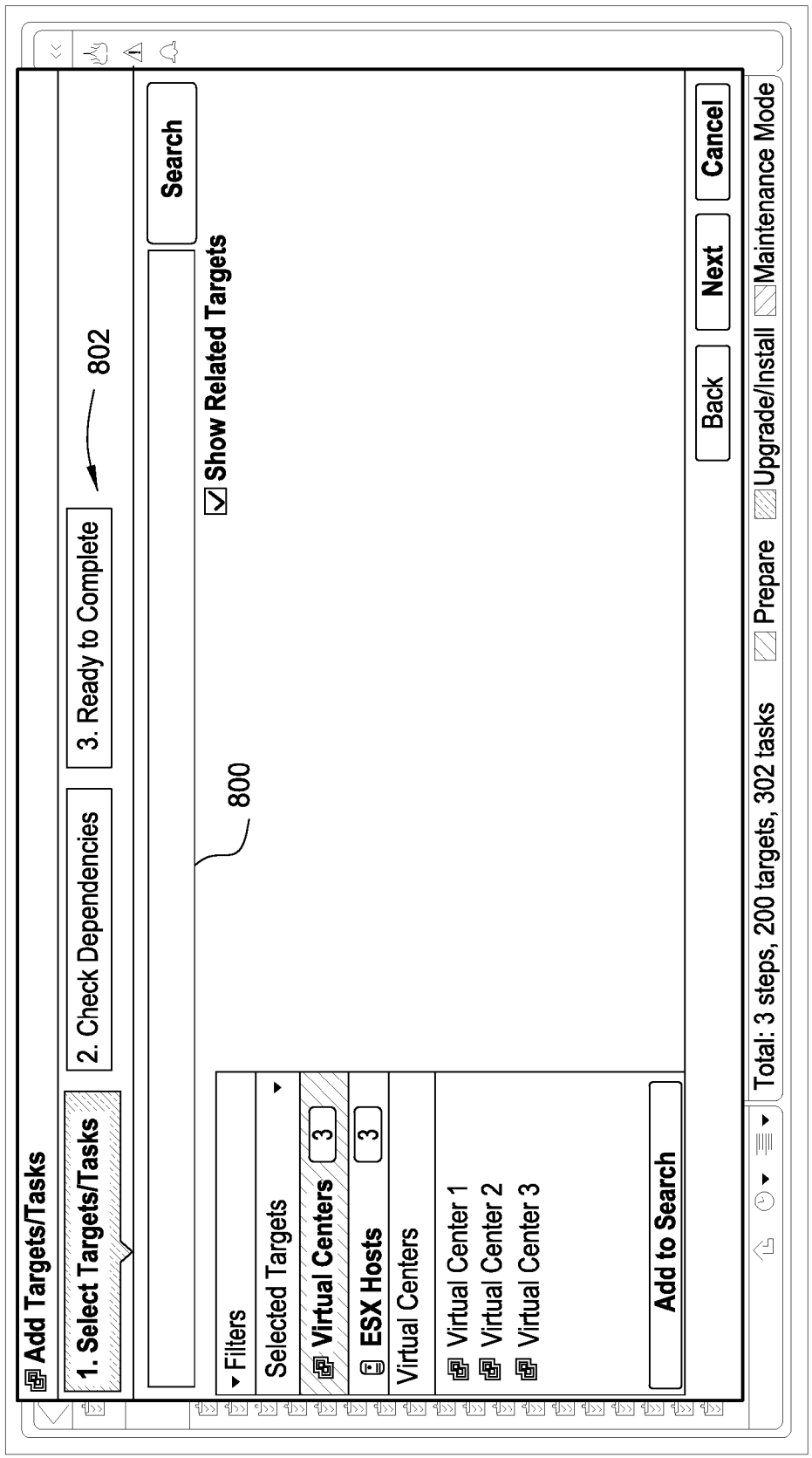

Referring back to FIG. 5A, as shown, the steps of upgrade plan creation process 502 are displayed vertically in a left-side column to guide the administrator through the upgrade plan creation process 502. In another embodiment, as shown in FIG. 8A, the steps 802 of upgrade plan creation process can be displayed horizontally along the top of the user interface. Also shown in FIG. 8A, a strict ordering of steps to create or add to an upgrade plan is not required. Instead, the interface may provide a search bar 800 where, if the administrator knows what he or she wants to search for, the administrator can type a textual query into the search bar. If the administrator does not know exactly what he or she is searching for, and needs help with suggestions, the administrator can browse through the filters step-by-step, adding a combination of targets, folders, containers, and/or software bundles in whatever order and/or combination he or she chooses. The design allows for flexible mixing of both free typing search (if the administrator know what he or she is looking for), or browsing (if the administrator does not know the precise names of assets and/or the syntax to create the search).

In yet another embodiment, as shown in FIG. 8B, the steps 804 of upgrade plan creation process can be displayed vertically in a left-side column, similar to FIG. 5A. However, the administrator can browse through additional filters: the assets in the virtual center inventory via button 806 to select targets, and/or may browse though the available upgrades via button 808. The user can browse through the filters available via buttons 806 and 808 in any order. The total number of resultant targets from the filtered list of targets is displayed in portion 810. The results can also be displayed in a table, as shown in FIG. 8B.

Figure 8C:
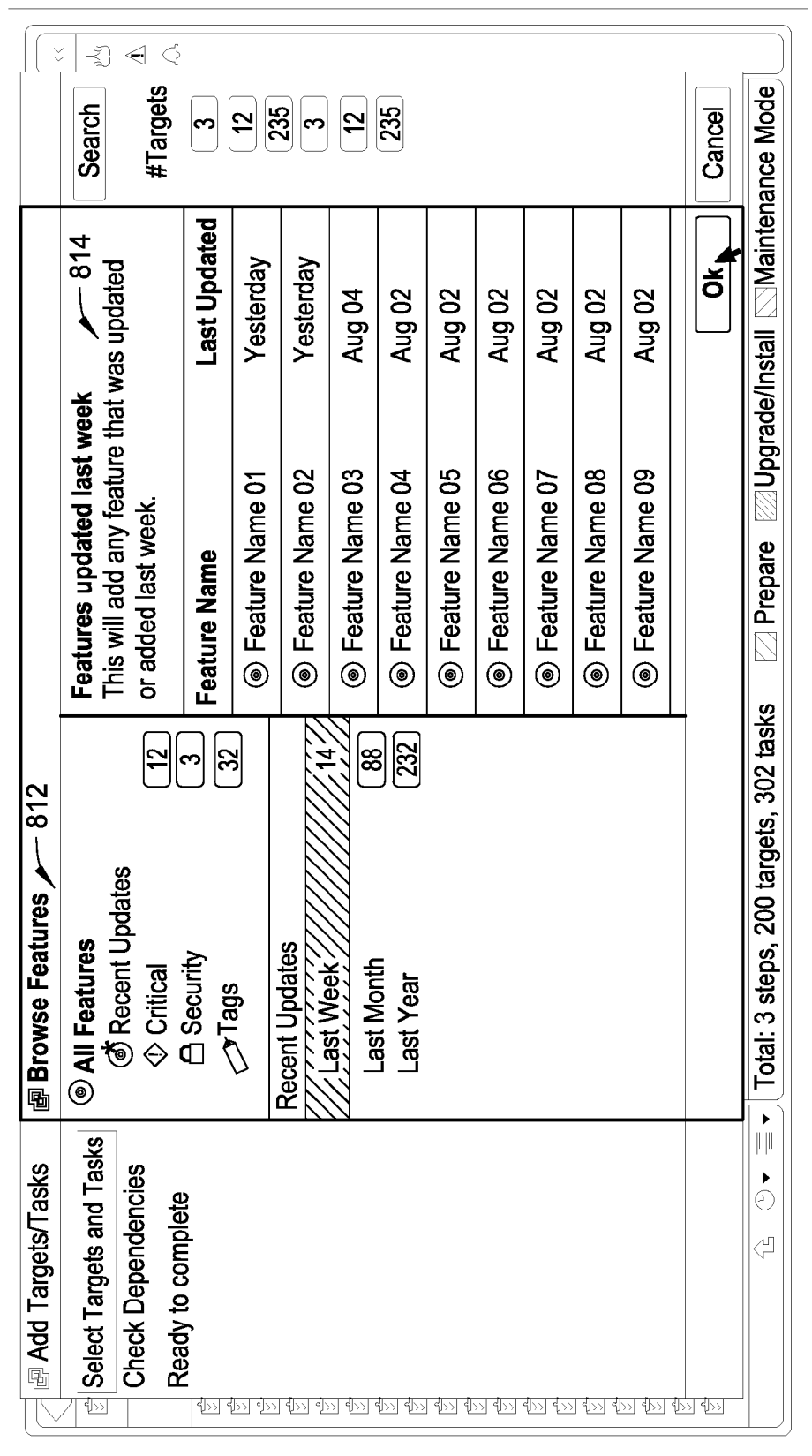

After the administrator selects button 808 to browse for features, a dialog as shown in FIG. 8C, is displayed. A two-tiered menu 812 may be displayed through which the administrator can select the appropriate upgrades to apply. A details portion 814 may also be displayed that provides additional details of the selected upgrade(s). The example shown in FIG. 8C for browsing features focuses on a specific filter type based on user selection and eliminates the need for one vertically stacked list of items of different filter types, as shown in FIG. 5A.

Figure 8D:
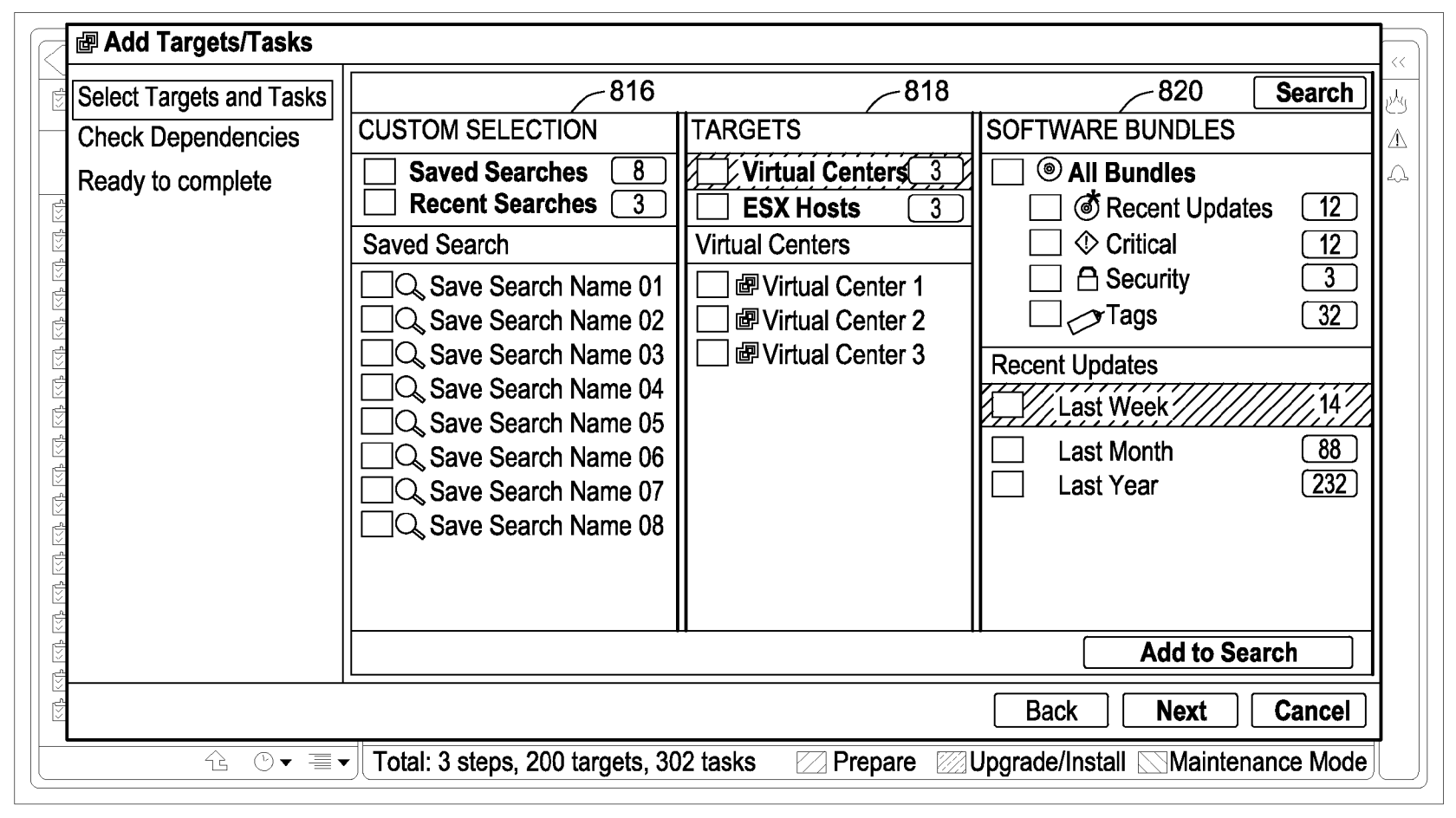

FIG. 8D is yet another embodiment of the user interface for generating an upgrade plan, according to one embodiment of the invention. In this embodiment, the steps of upgrade plan creation process are displayed vertically in a left-side column. Also, separate sections of the remaining portions of the user interface are divided into a custom selection section 816, a targets selection section 818, and an updates selection section 820. In this manner, the administrator can select the appropriate targets and updates from a single user interface window. In some cases, this embodiment of the user interface is most useful for allowing one filter to affect another. For example, after selecting "Hosts" from the targets selection section 818, the number of applicable software bundle filters may reduce to software bundle filters relevant only to Hosts.

Figure 8E:
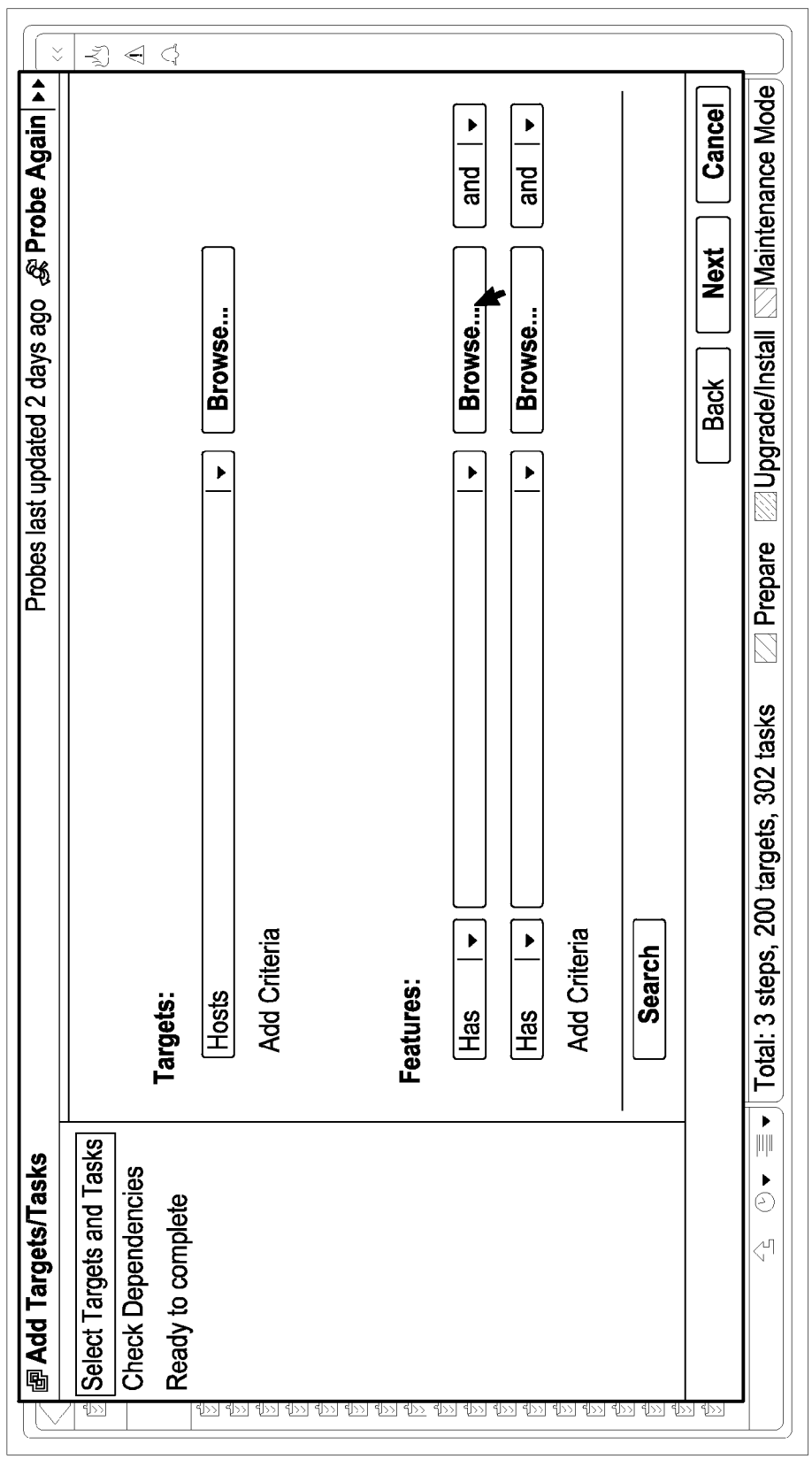

FIG. 8E is yet another embodiment of the user interface for generating a search query for targets to upgrade, according to one embodiment of the invention. In some cases, this interface provides a simple, guided search for users. This interface allows the user to step through how to construct a basic search query from one or more drop-down menus. In some cases, such an interface may be more restrictive in terms of options available to the user.

Figure 9A:
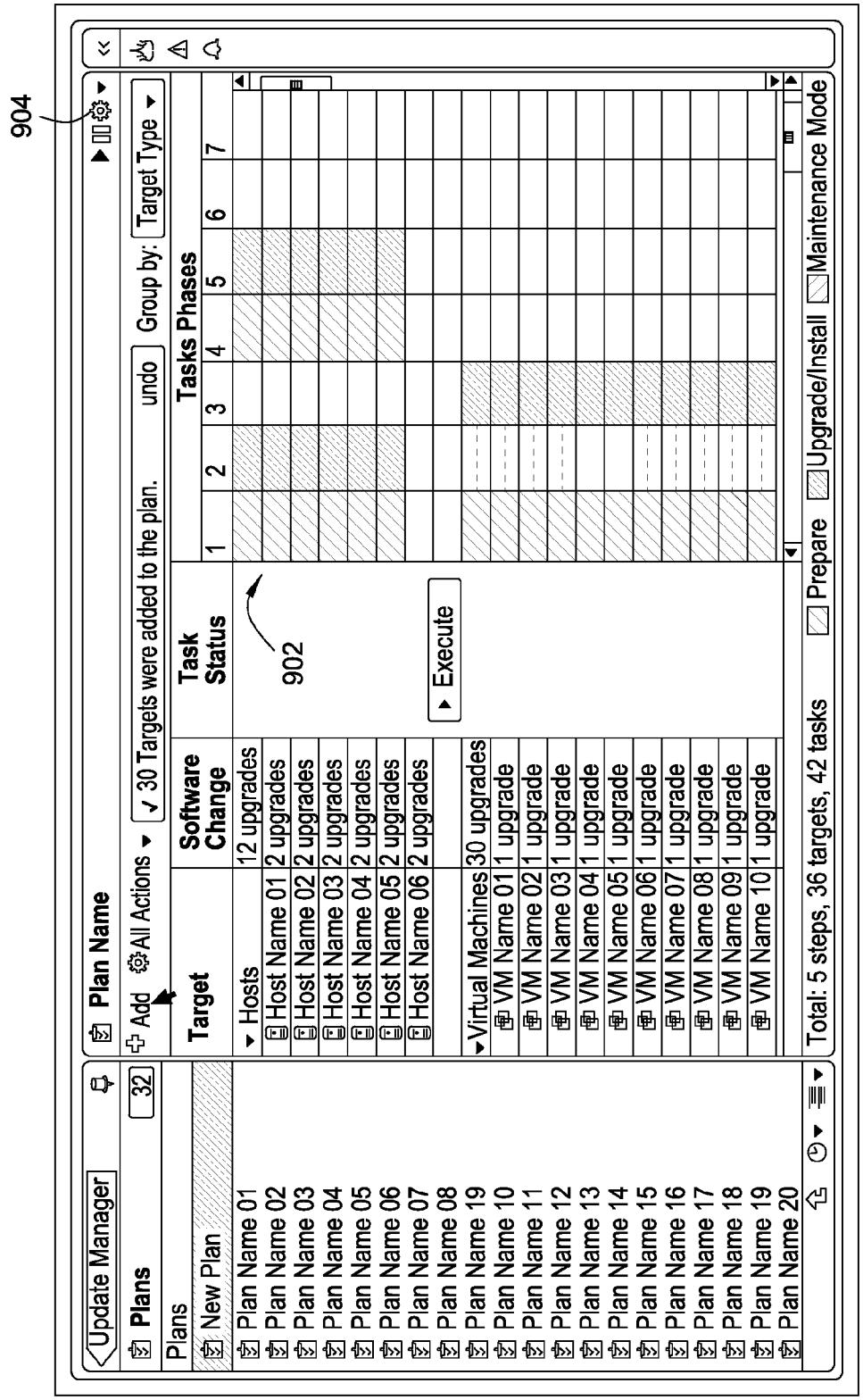
FIGS. 9A-9E depict screenshots of a layout of an upgrade plan, according to various embodiments of the invention.

FIGS. 9A-9E depict screenshots of a layout of an upgrade plan, according to various embodiments of the invention. As described, once the user selects the appropriate assets and upgrades, the cloud management application 110 can automatically generate an upgrade plan that defines in what sequence each of the assets is to be updated. The administrator can choose when to execute the sequence, or schedule execution of the sequence. In FIG. 9A, "New Plan" is shown as selected. The installation process of the various assets can be displayed in timeline 902. In the illustrated example, the timeline 902 is broken down into phases. For each asset to be upgraded, the timeline 902 illustrates a prepare phase and an deploy phase of the installation process. In this manner, the administrator can see a visual indication of the upgrade plan according to when updates are going to be applied to each asset as well as when a system may be in maintenance mode.

Figure 9B:
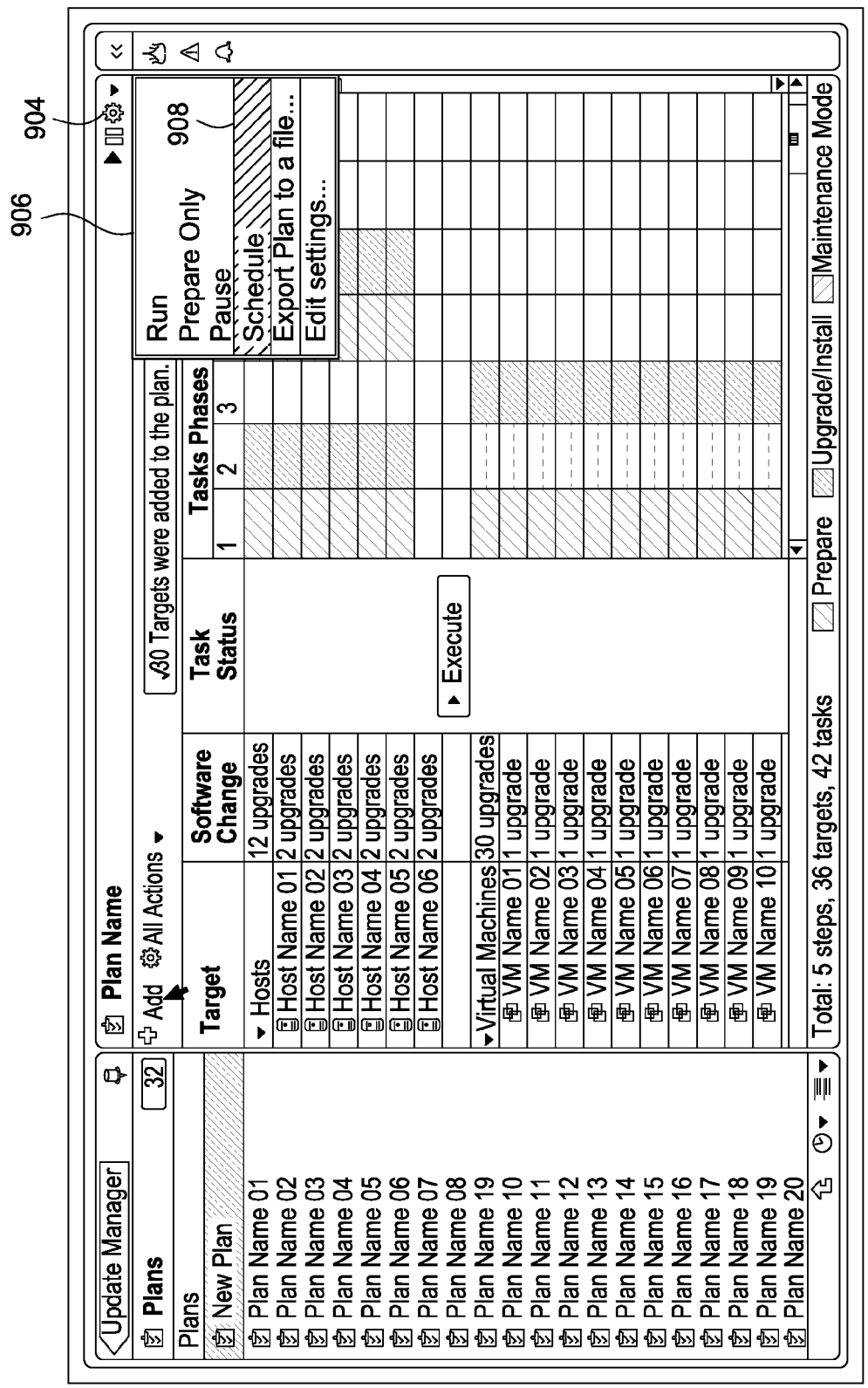
Figure 9C:
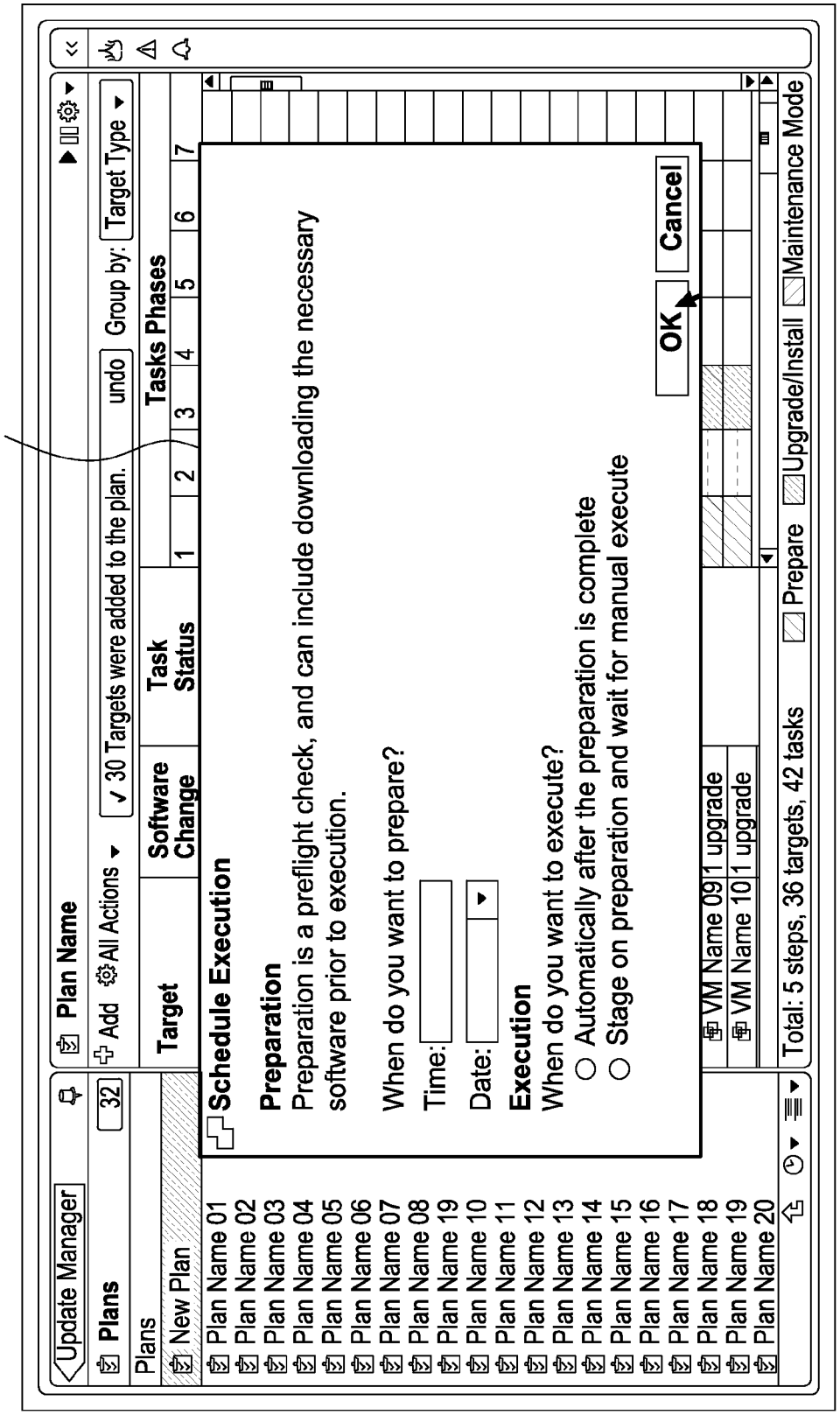

The administrator can also select an actions button 904, which causes a actions menu 906 to be displayed, as shown in FIG. 9B. From the actions menu 906, the administrator can select a schedule button 908 to schedule execution of the upgrade plan. Selecting the schedule button 908 causes a schedule dialog 910 to be displayed, as shown in FIG. 9C. From the schedule dialog 910, the administrator can input a date and time at which the upgrade plan should begin to be executed and/or a date and time by which the upgrade plan should be completed. Other technically feasible options are also within the scope of embodiments of the invention. For example, the administrator may schedule just the preparation phase of the upgrade plan or the entire upgrade plan. Scheduling a portion of the upgrade plan may, in some cases, be useful for ROBO (remote office & branch office) sites where the network is slow and downloading is difficult.

Figure 9D:
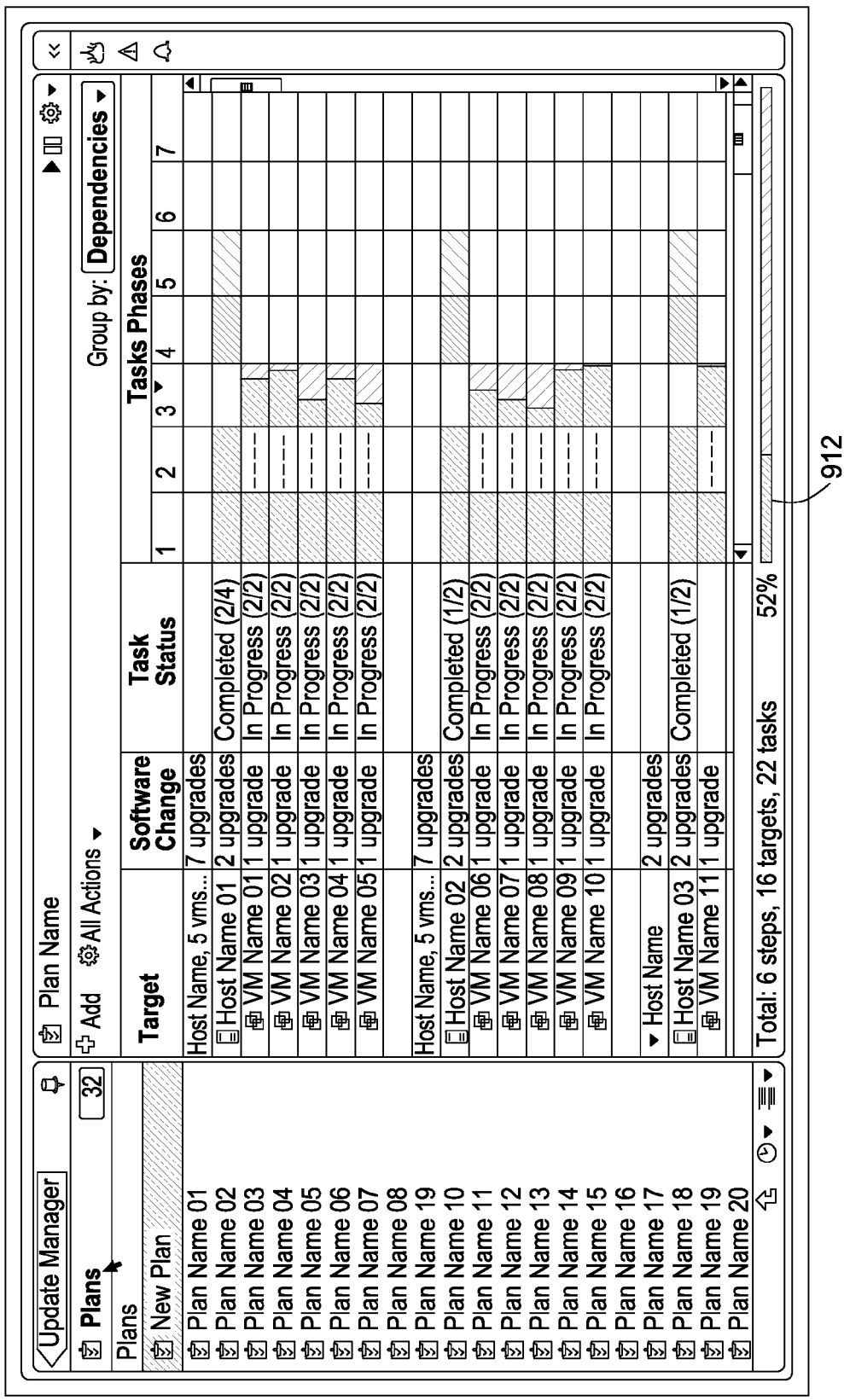

FIG. 9D depicts a screenshot of a user interface for an upgrade plan that is executing, according to one embodiment of the invention. As shown, a progress bar 912 is displayed that indicated the overall progress of the upgrade plan execution.

Figure 9E:
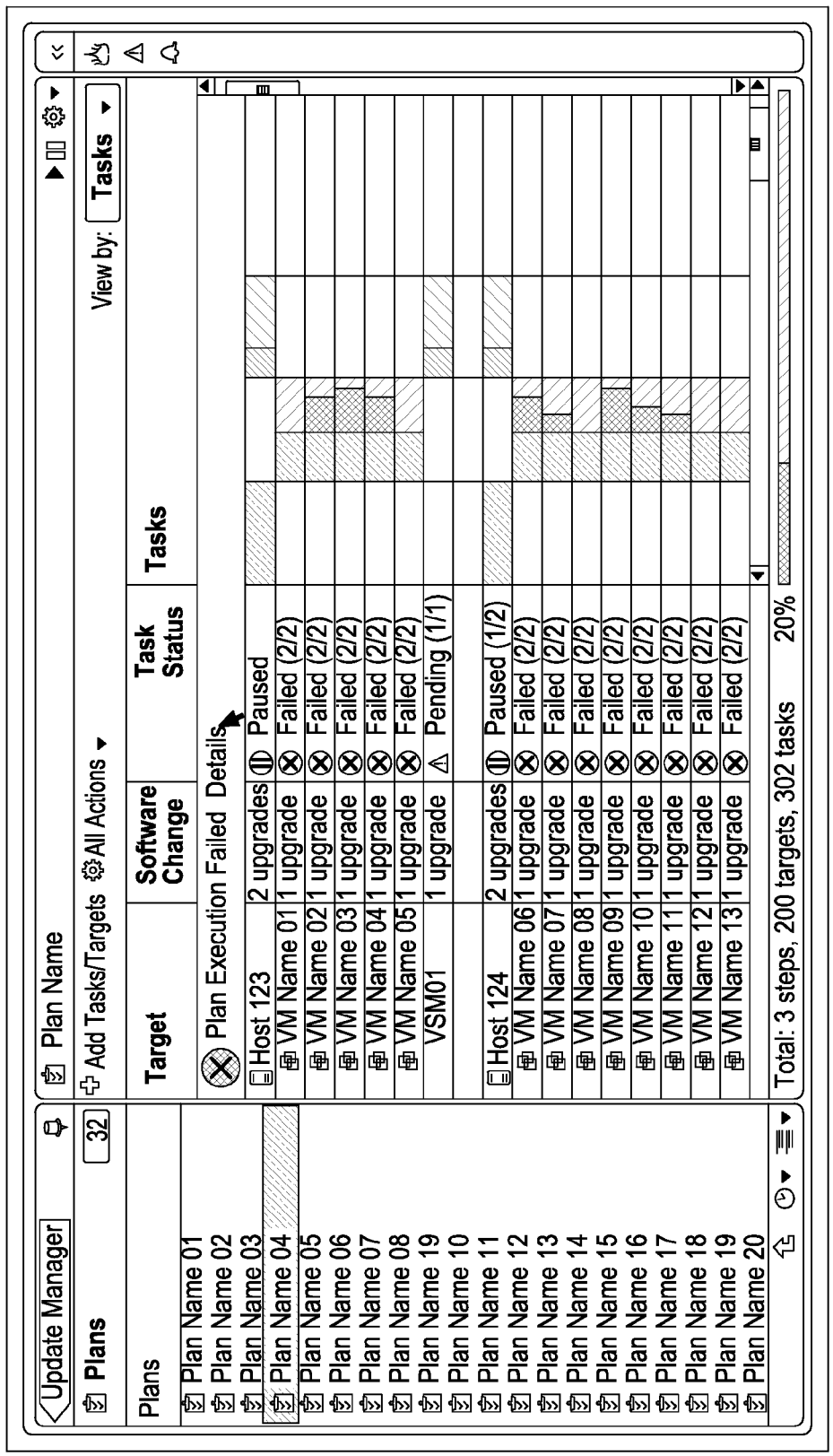

FIG. 9E depicts a screenshot of a user interface for an upgrade plan that has encountered an error, according to one embodiment of the invention. As shown, the user interface can display which assets are affected by the error, which assets are still awaiting the installation to begin, and which assets have their upgrade paused. The administrator can troubleshoot the execution of the upgrade plan from this user interface.

Figure 10A:
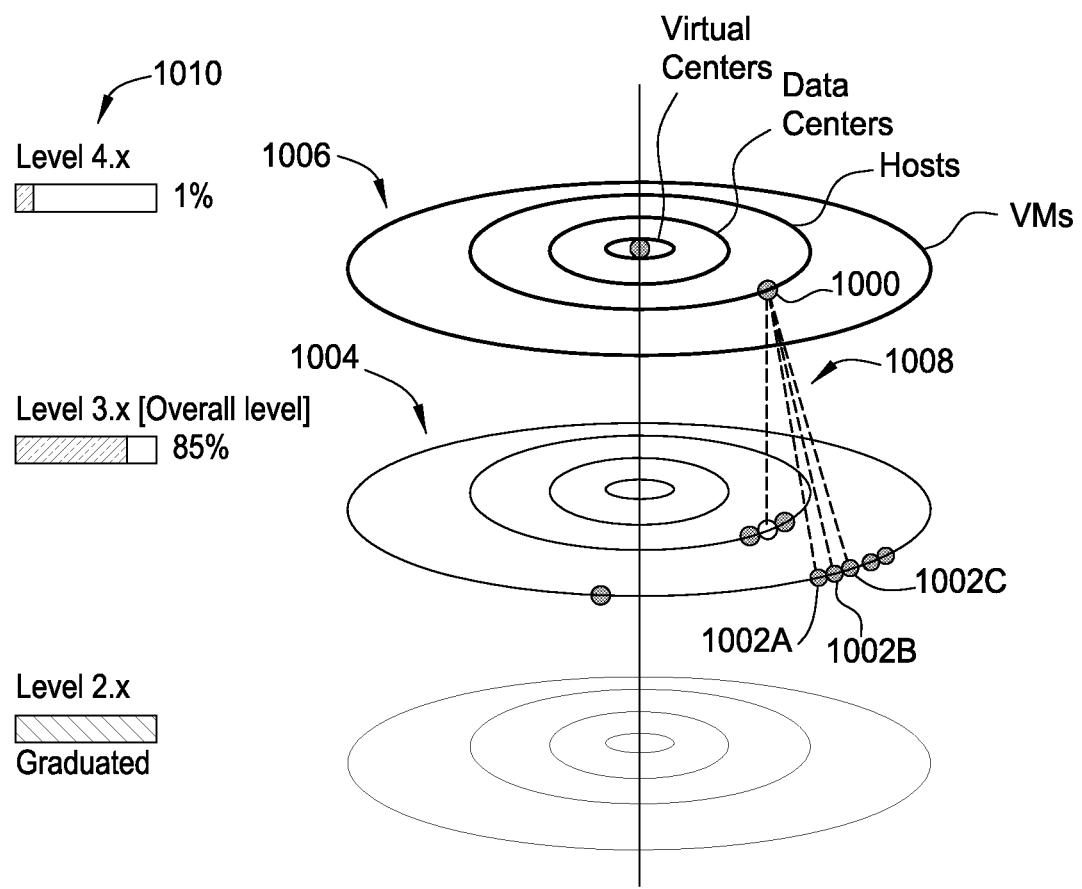
Figure 10B:
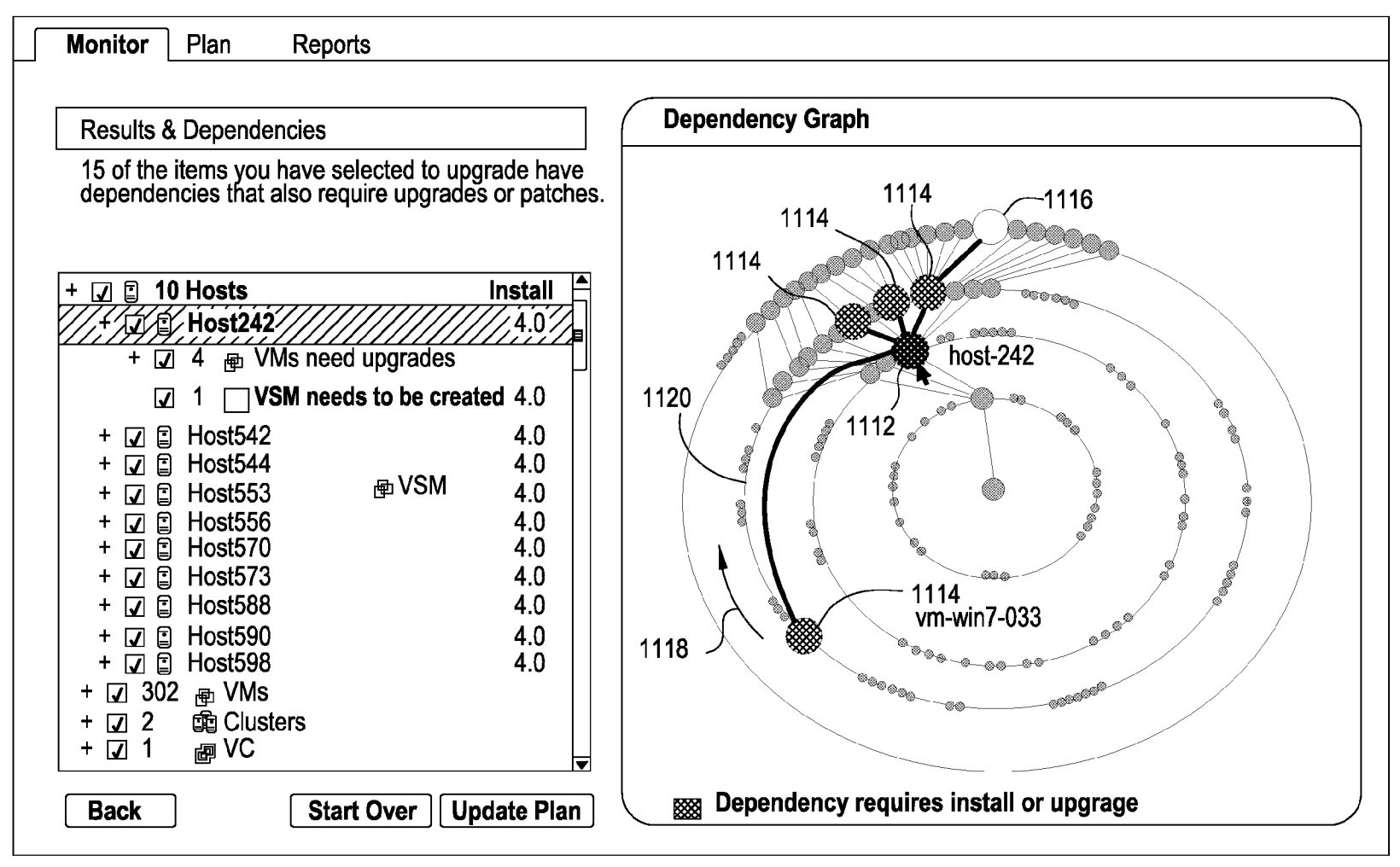

FIGS. 10A-10B depict screenshots of alternate embodiments of user interfaces for displayed dependencies between assets, according to various embodiments of the invention. As shown in FIG. 10A, each asset type can be displayed at as a concentric ring. In the example shown, virtual centers are shown on the smallest ring, followed by data centers on larger ring, then followed by hosts, and lastly VMs. The various nodes that are present on a particular ring represent assets that are of that asset type. In some embodiments, the ring size reflects a relative depth of a position in the hierarchy. Often, the deeper one travels in the inventory tree, the more total children of a type there are. Accordingly, of the four rings shown, the VM ring may include the largest number of assets. In some embodiments, a user interface as shown in FIG. 10A can be displayed in conjunction with the user interface shown in FIG. 9A that illustrates the phases of an upgrade plan. For example, the user interface shown in FIG. 10A can display assets moving up from one level to another, and can fill out as the plan progress in the interface in FIG. 9A.

Different sets of concentric rings can represent different "upgrade levels." For example set 1004 may represent upgrade level 3.0 and set 1006 may represent upgrade level 4.0.

The user interface may allow the administrator to drag-and-drop assets from one upgrade level to another upgrade level. For example, the administrator may select asset 1000 and drag the asset from set 1004 to set 1006. In response, the cloud management application 110 may display lines 1008 to assets 1002A, 1002B, and 1002C, indicating that assets 1002A-1002C depend from asset 1000. Accordingly, if asset 1000 were added to the upgrade plan, then assets 1002A, 1002B, and 1002C could also automatically be added to the upgrade plan.

As shown, the user interface may include status indicators 1010 that depict the percentage of assets that are currently at a particular upgrade level. Displaying the status indicators 1010 may, in some cases, encourage administrators to upgrade assets in their inventory to the next higher upgrade level as a form of "up-selling" new upgrades.

FIG. 10B depicts a screenshot of yet another embodiment of a user interface for displayed dependencies between assets. When a particular asset is selected, such as asset 1112, other assets that depend on the selected asset can grow larger, and assets with additional upgrade requirements can be even larger and can be highlighted, such as assets 1114 and 1116. Embodiments also display the lines to show the relatedness, and vary the line thickness if a further upgrade dependency is necessary In one embodiment, assets that are one degree of separation from the selected asset 1112 are displayed in a first color, and assets that are two degrees of separation from the selected asset are displayed in a second color. In another embodiment, assets that need to be created to execute the upgrade plan are displayed in a different color than other assets that are to be upgraded. In yet another embodiment, the assets that depend on the selected asset can slide along their respective rings to be closer to the selected asset 1112. For example, one of the assets 1114 (e.g., "vm-win7-033") can slide along ring 1120 in the direction of arrow 1118 to be closer to asset 1112. Moving dependent assets closer to the selected asset 1112 may, in some embodiments, reduce the clutter of the user interface and allow for easier reading of the relevant items (i.e., the user does not have to look all over the interface to find them).

Figure 11:
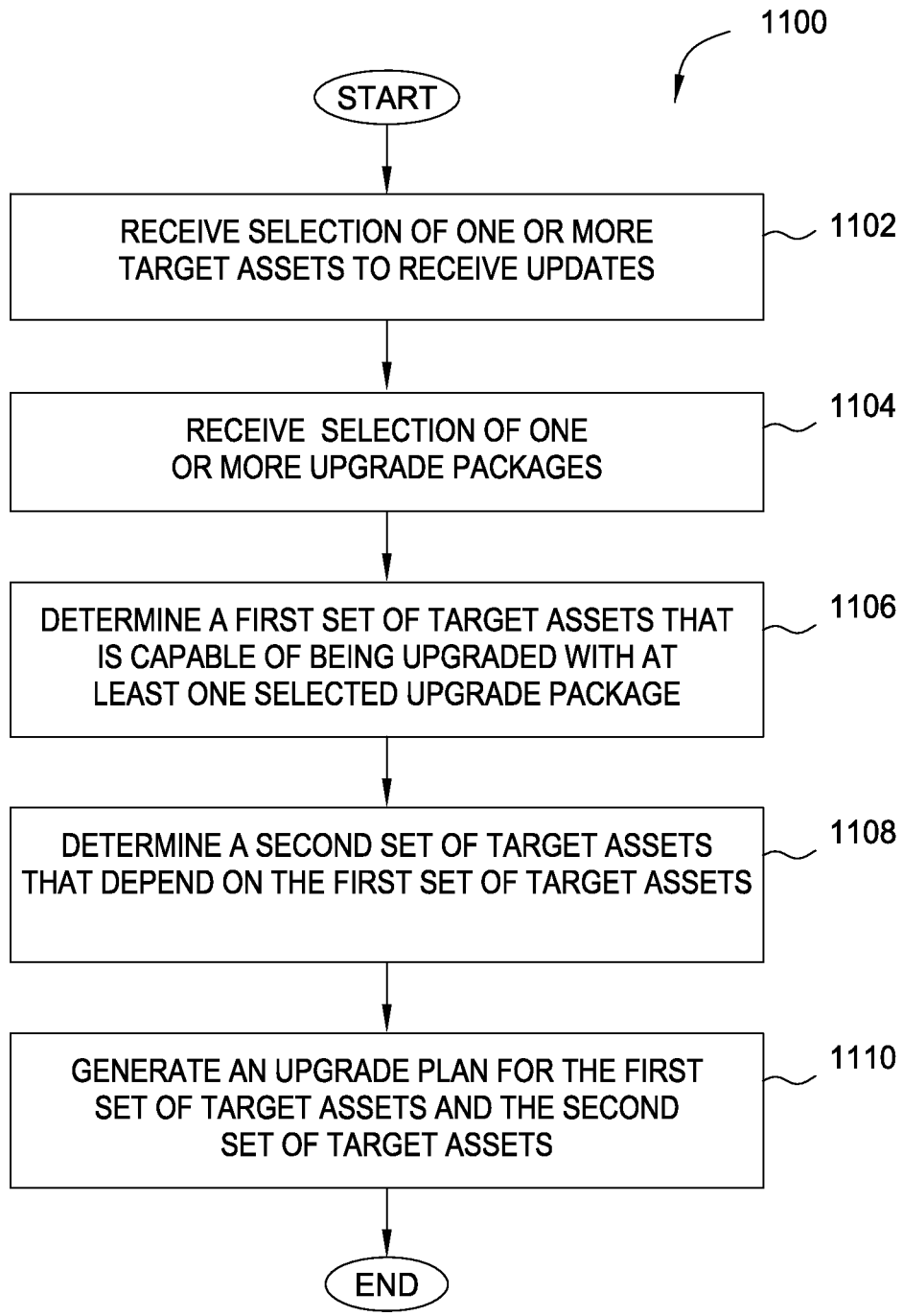
FIG. 11 is a flow diagram for generating an upgrade plan, according to one embodiment of the invention.

FIG. 11 is a flow diagram for generating an upgrade plan, according to one embodiment of the invention. Persons skilled in the art would understand that, even though the method 1100 is described in conjunction with the systems of FIGS. 1A-10B, any system configured to perform the method steps is within the scope of embodiments of the invention.

As shown, the method 1100 begins at step 1102, where a cloud management application 110 executed by a processor receives a selection of one or more target assets to receive updates. According to various embodiments, the set of target assets may be selected via a user interface, such as that shown in any one of FIGS. 4A-5C and 8A-8E.

At step 1104, cloud management application 110 receives a selection of one or more upgrade packages. According to various embodiments, the one or more upgrade packages may be selected via a user interface, such as that shown in any one of FIGS. 4A-4B, 5D-5E, and 8A-8E.

At step 1106, cloud management application 110 determines a first set of target assets that is capable of being upgraded with at least one selected upgrade package. The first set of target assets may include those assets that have a current upgrade level that is compatible with one or more of the upgrade packages selected in step 1104.

At step 1108, cloud management application 110 determines a second set of target assets that depend on the first set of target assets. As described above, when a particular asset is selected as a target asset to be updated (i.e., is included in the first set of target assets), one or more other assets may depend from the particular asset and may also need to be upgraded in order for the updates to be installed properly. In some cases, the dependent assets may have further dependent assets in a chain-like manner. In these embodiments, all of the dependent assets, at all levels, can be included in the second set of target assets. In some embodiments, the cloud management application 110 can determine the set of dependent target assets based on a hierarchical inventory tree of the virtualized computing environment.

At step 1110, cloud management application 110 generates an upgrade plan for the first set of target assets and the second set of target assets. As described, the upgrade plan can be displayed in a timeline format so that the administrator can visually see the installation plan for the various assets. One advantage of having such an upgrade visualization is that administrators can visually simulate the plan in execution. In one example, if the administrator presses a "play" button, the time slider progresses through the plan, and the administrator can watch the objects change state, whether the upgrade is a single patch, multiple patches, or an entire system-level upgrade. The administrator can see when different parts of their virtual computing environment will go offline and he or she can interactively rearrange the plan and simulate other options until he or she is satisfied with the plan.

In sum, one or more embodiments of the invention provide a visual dashboard that displays the status of the components of the virtualized computing environment as well as new features and/or upgrades that are available. Embodiments also provide a technique to create a guided plan where the administrator can specify, at a high level, what constraints should be enforced. Additionally, embodiments provide a visualization tool that allows the administrator to see a visual overview of the virtualized computing environment and/or related items, dependencies between components of the virtualized computing environment, and a visual preview that shows the effects of performing an upgrade or install.

Advantageously, embodiments of the invention allow the administrator to more easily create plans to upgrade their virtual computing environment through guided plan creation, an interactive planner, and visualization of upgrade dependencies and plan execution.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for generating an upgrade plan for assets included in a virtualized computing environment, the method comprising:
receiving a selection of one or more target assets to receive updates, wherein the one or more target assets are components of a virtualized computing environment;
receiving a selection of one or more upgrade packages;
determining a first set of target assets that is capable of being upgraded with at least one selected upgrade package;
determining a second set of target assets that depend on the first set of target assets; and
generating an upgrade plan for the first set of target assets and the second set of target assets; and
displaying assets in the virtualized computing environment on a stack of sets of concentric rings,
wherein each set of concentric rings is on a different plane,
wherein each ring in a set of concentric rings represents a different asset type of
the virtualized computing environment,
wherein each set of concentric rings has a first ring and a second ring,
wherein assets displayed on the first concentric ring represents virtual machines in the virtualized computing environment, and
wherein assets displayed on the second concentric ring represent host in the virtualized computing environment, and
wherein each set of concentric rings represents a different upgrade level of the virtualized computing environment.

2. The method of claim 1, further comprising displaying a timeline representing a visual layout of the upgrade plan.

3. The method of claim 1, wherein one or more of the target assets comprises a virtual center, a data center, a host computer, or a virtual machine.

4. The method of claim 1, further comprising displaying a user interface that includes a count for the number of assets that are capable of being upgraded organized by asset type.

5. The method of claim 1, further comprising displaying a two-tiered selection menu, wherein a selection of an item in a top portion causes corresponding options to be displayed in a bottom portion.

6. The method of claim 5, wherein the selection of one or more target assets and/or the selection of one or more upgrade packages is received via the two-tiered selection menu.

7. The method of claim 1, wherein determining the second set of target assets that depend on the first set of target assets is based on a hierarchical tree of the assets in the virtualized computing environment.

8. The method of claim 1, further comprising receiving one or more parameters for execution of the upgrade plan, wherein the one or more parameters include at least one of a time to begin execution of the upgrade plan or a time to complete execution of the upgrade plan.

9. The method of claim 1, further comprising displaying a visual indication from a first object associated with a first concentric ring to a second object associated with a second co-centric ring indicating that the second object depends from the first object.

10. A non-transitory computer-readable storage medium storing instructions that, when executed by a processor, cause a computing device to generate an upgrade plan for assets included in a virtualized computing environment, by performing the steps of:
receiving a selection of one or more target assets to receive updates, wherein the one or more target assets are components of a virtualized computing environment;
receiving a selection of one or more upgrade packages;
determining a first set of target assets that is capable of being upgraded with at least one selected upgrade package;
determining a second set of target assets that depend on the first set of target assets; and
generating an upgrade plan for the first set of target assets and the second set of target assets; and
displaying assets in the virtualized computing environment on a stack of sets of concentric rings,
wherein each set of concentric rings are a different plane,
wherein each ring in a set of concentric rings represents a different asset type of the virtualized computing environment,
wherein each set of concentric rings has a first ring and a second ring,
wherein assets displayed on the first concentric ring represents virtual machines in the virtualized computing environment, and
wherein assets displayed on the second concentric ring represent host in the virtualized computing environment, and
wherein each set of concentric rings represents a different upgrade level of the virtualized computing environment.

11. The computer-readable storage medium of claim 10, further comprising displaying a timeline representing a visual layout of the upgrade plan.

12. The computer-readable storage medium of claim 10, further comprising displaying a two-tiered selection menu, wherein a selection of an item in a top portion causes corresponding options to be displayed in a bottom portion.

13. The computer-readable storage medium of claim 12, wherein the selection of one or more target assets and/or the selection of one or more upgrade packages is received via the two-tiered selection menu.

14. The computer-readable storage medium of claim 10, further comprising receiving one or more parameters for execution of the upgrade plan, wherein the one or more parameters include at least one of a time to begin execution of the upgrade plan or a time to complete execution of the upgrade plan.

15. A computer system for generating an upgrade plan for assets included in a virtualized computing environment, the computer system comprising:
- a processor configured to generate and display a graphical user interface for a virtualized computing environment, the graphical user interface comprising:
- a first portion for receiving a selection of one or more target assets to receive updates, wherein the one or more target assets are components of a virtualized computing environment;
- a second portion for receiving a selection of one or more upgrade packages, wherein the processor is further configured to:
  - determine a first set of target assets that is capable of being upgraded with at least one selected upgrade package,
  - determine a second set of target assets that depend on the first set of target assets, and
  - generate an upgrade plan for the first set of target assets and the second set of target assets; and
- a graph portion for displaying assets in the virtualized computing environment on a stack of sets of concentric rings,
- wherein each set of concentric rings are a different plane,
- wherein each ring in a set of concentric rings represents a different asset type of the virtualized computing environment,
- wherein each set of concentric rings has a first ring and a second ring,
- wherein assets displayed on the first concentric ring represents virtual machines in the virtualized computing environment, and
- wherein assets displayed on the second concentric ring represent host in the virtualized computing environment, and
- wherein each set of concentric rings represents a different upgrade level of the virtualized computing environment.

16. The computer system of claim 15, further comprising a third portion for displaying a timeline representing a visual layout of the upgrade plan.

17. The computer system of claim 15, wherein the first portion and the second portion include a two-tiered selection menu, wherein a selection of an item in a top portion of the two-tiered selection menu causes corresponding options to be displayed in a bottom portion of the two-tiered selection menu.

18. The computer system of claim 17, wherein the selection of one or more target assets and/or the selection of one or more upgrade packages is received via the two-tiered selection menu.

19. The computer system of claim 15, further comprising a parameters portion for receiving one or more parameters for execution of the upgrade plan, wherein the one or more parameters include at least one of a time to begin execution of the upgrade plan or a time to complete execution of the upgrade plan.

* * * * *